United States Patent [19]
Ohtomo et al.

[11] Patent Number: 6,075,586
[45] Date of Patent: *Jun. 13, 2000

[54] LASER SURVEY INSTRUMENT

[75] Inventors: Fumio Ohtomo; Satoshi Hirano, both of Tokyo-to, Japan; Richard W. Davidson, Livermore, Calif.

[73] Assignee: Kabushiki Kaisha TOPCON, Tokyo-to, Japan

[*] Notice: This patent is subject to a terminal disclaimer.

[21] Appl. No.: 09/314,825

[22] Filed: May 19, 1999

Related U.S. Application Data

[60] Continuation of application No. 09/014,181, Jan. 27, 1998, which is a division of application No. 08/598,322, Feb. 8, 1996, Pat. No. 5,784,155.

[51] Int. Cl.⁷ .............................. G01C 3/08; G01C 1/00; G01B 11/26
[52] U.S. Cl. .................................... 356/4.08; 356/139.07; 356/139.1; 356/141.1
[58] Field of Search ................... 356/4.08, 141.1, 356/141.4, 139.07, 139.1

[56] References Cited

U.S. PATENT DOCUMENTS

| | | | |
|---|---|---|---|
| 3,588,249 | 6/1971 | Studebaker | 356/4 |
| 3,846,026 | 11/1974 | Waters | 356/152 |
| 4,326,799 | 4/1982 | Keene et al. | 356/152 |
| 4,673,287 | 6/1987 | Rickus | 356/4 |
| 4,830,489 | 5/1989 | Cain et al. | 356/73 |
| 5,076,690 | 12/1991 | de Vos et al. | 356/152 |
| 5,098,185 | 3/1992 | Watanabe et al. | 356/5 |
| 5,371,581 | 12/1994 | Wangler et al. | 356/5 |
| 5,587,787 | 12/1996 | Jager | 356/141.1 |
| 5,680,208 | 10/1997 | Butler et al. | |

FOREIGN PATENT DOCUMENTS 6-258830  9/1994  Japan.

*Primary Examiner*—Stephen C. Buczinski
*Attorney, Agent, or Firm*—Nields, Lemack & Dingman

[57] ABSTRACT

A laser survey instrument, which comprises at least a main unit for emitting a laser beam and an object reflector for reflecting the laser beam from the main unit toward the main unit, whereby said main unit comprises an emitter for emitting the laser beam, a rotating unit for rotating and scanning the laser beam, a tilting mechanism for tilting the laser beam at an arbitrary angle at least in one direction with respect to a horizontal plane, a rotating angle detector interlocked with the rotating unit and for detecting irradiating direction of the laser beam, a reflection light detector for detecting reflection light from the object reflector, and an alignment display unit for detecting a deviation of direction with respect to the object reflector and a deviation of tilt angle based on a signal from the reflection light detector and for obtaining information on the deviation of direction or the tilt angle, the laser beam emitted from the main unit is irradiated to scan, the center of the object reflector is determined based on the laser beam reflected from the object reflector during scanning process, information on a deviation of direction of the main unit and a deviation of tilt angle is displayed, or direction and tilt angle of the main unit are corrected automatically based on the deviation of direction thus obtained or on the deviation of tilt angle thus obtained.

9 Claims, 30 Drawing Sheets

LASER BEAM SCANNING DIRECTION

OUTPUT SIGNAL OF DIFFERENTIAL
AMPLIFIER 134

LASER BEAM SCANNING DIRECTION

OUTPUT SIGNAL OF DIFFERENTIAL AMPLIFIER 134

LASER SURVEY INSTRUMENT

This application is a continuation of U.S. Ser. No. 09/014,181 filed Jan. 27, 1998, which is a divisional of U.S. Ser. No. 08/598,322 filed Feb. 8, 1996, now U.S. Pat. No. 5,784,155.

BACKGROUND OF THE INVENTION

The present invention relates to a laser survey instrument, by which it is possible to provide a measurement reference plane by a laser beam, and in particular to provide, in addition to a horizontal reference plane, an arbitrary tilt setting plane tilted at a given angle to the horizontal reference plane.

Laser survey instruments are used for providing a horizontal reference plane in wide range instead of optical level.

By such laser survey instruments, the horizontal reference line is formed by projecting a laser beam in a horizontal direction, or the horizontal reference plane is formed by projecting the laser beam in a horizontal direction via a rotating prism.

In architectural engineering work and civil engineering work, positioning and horizontal level setting are performed by utilizing the horizontal reference plane. For example, a reference position is determined by the detection of the laser beam by a photodetector, and this is used for setting-out of mounting position for windows or of a horizontal line for ceiling in interior finishing work.

Also, as proposed by the present applicant in Japanese Patent Publication Laid-Open No. 6-26861, such a laser survey instrument is now used not only for the setting of horizontal level but also in the setting of tilt level, and it is widely used in construction work such as the setting of water drainage inclination of a road or the setting of a road surface gradient.

Description is now given on the laser survey instrument proposed in Japanese Patent Publication Laid-Open No. 6-26861, referring to FIGS. 28 to 35.

At the center of a casing 5, a recess 6 in truncated conical shape is formed, and a support seat 7 is provided at the center of the recess 6. The support seat 7 comprises projections 9, which are protruded smoothly with tertiary curved surface at 3 equally spaced positions on inner periphery of a circular through-hole 8.

A laser projector 10 for emitting a laser beam is placed in the through-hole 8, and a head 11 of the laser projector 10 is engaged in and supported by the support seat 7. The head 11 has its lower portion designed in spherical shape, and this spherical portion 11a slidably contacts the above three projections 9. The laser projector 10 is supported in such manner that it can be tilted in any direction with respect to the vertical line.

A motor seat 14 is provided on the head 11, and a scanning motor 15 is arranged on the motor seat 14. A gear 16 is engaged with the output shaft of a scanning motor 15. The gear 16 is engaged with a scanning gear 17, which is to be described later.

The axis of the laser projector 10 is aligned with the head 11 of the laser projector 10, and a mirror holder 13 is rotatably arranged via a bearing 12. The scanning gear 17 is engaged on the mirror holder 13. As described above, the scanning gear 17 is engaged with the gear 16 so that the mirror holder 13 can be rotated around the vertical shaft by the scanning motor 15. A pentagonal prism 18 is provided on the mirror holder 13, and the laser beam emitted from the laser projector 10 is irradiated in a horizontal direction via a light projecting window 19.

At the middle portion of the laser projector 10, a sensor support shelf 63 is arranged, on which fixed bubble tubes 20 and 21, serving as tilting detectors for detecting the horizontality, are provided so that they are directed perpendicular to each other. The fixed bubble tubes 20 and 21 are electric bubble tubes of capacitance detection type and each of them issues an electrical signal corresponding to a tilt angle with respect to the horizontal plane.

At the lower end of the laser projector 10, a base plate 64 of approximately in form of a right-angled triangle is fixed, and a strut 70 is erected near the vertex of the rectangular portion of the base plate 64, and a ball 67 is fixed on the upper end of the strut 70. An L-shaped tilting plate 62 is arranged above the base plate 64, and a conical recess 99 is formed at the vertex on the rear surface of the tilting plate 62. The ball 67 is engaged with the recess 99, and the apical portion of the tilting plate 62 is supported on the strut 70 so that the tilting plate 62 is pivotable on the ball 67. Further, a spring 68 is provided between the tilting plate 62 and the base plate 64, and the conical recess 99 is pressed against the ball 67, and the tilting plate 62 is pushed clockwise in FIG. 28.

Arbitrary angle setting bubble tubes 65 and 66, serving as tilting movement detectors, are arranged on the tilting plate 62 along the L-shaped portion so that the arbitrary angle setting bubble tubes lie in two directions perpendicular to each other.

A bearing plate 72 is positioned under the sensor support shelf 63 and is protruded from the laser projector 10. Tilting screws 52 and 53 are rotatably mounted at such positions on the base plate 64 as to form a triangle with the strut 70 at its vertex, and the upper ends of the tilting screws 52 and 53 are rotatably supported on the bearing plate 72.

The lower end of the tilting screw 52 is protruded downward from the base plate 64, and tilting gear 54 is engaged with the protruding end of the tilting screw 52. The tilting gear 54 is then engaged with a tilting gear 56 to be described below. The lower end of the tilting screw 53 is protruded downward from the base plate 64, and a tilting gear 55 is engaged with the protruding end of the tilting screw 53. The tilting gear 55 is then engaged with a tilting gear 57 to be described below.

A tilting nut 48 is engaged on the tilting screw 52, and a nut pin 50 having circular cross-section is protruded on the tilting nut 48. A tilting pin 60 having circular cross-section is protruded at such position on the end surface of the tilting plate 62 closer to the arbitrary angle setting bubble tube 65 as to be in parallel to the center line of the arbitrary angle setting bubble tube 65, and the tilting pin 60 is brought into contact with the nut pin 50. Further, two parallel guide pins 71 are connected and they bridge between the base plate 64 and the bearing plate 72, and the tilting pin 60 is slidably held by the two guide pins 71 in order to restrict rotation of the tilting plate 62 in a horizontal direction and to allow the tilting pin 60 to rotate in a vertical direction and around the shaft of the tilting pin 60.

A tilting nut 49 is engaged on the tilting screw 53, and a nut pin 51 having circular cross-section is protruded at such position on the tilting nut 49. A tilting pin 61 having circular cross-section is protruded at such position on the end surface of the tilting plate 62 closer to the arbitrary angle setting bubble tube 66 as to be in parallel to the center line of the arbitrary angle setting bubble tube 66, and the tilting pin 61 is brought into contact with the nut pin 51.

On the lower surface of the base plate 64, a post 73 is suspendedly mounted, and a tilt detecting piece 23, also serving as a motor base, is fixed via this post 73. On the upper surface of the tilt detecting piece 23, tilting motors 58 and 59 are provided, and the tilting gear 56 aforementioned is engaged on the output shaft of the tilting motor 58, and the tilting gear 57 is engaged on the output shaft of the tilting motor 59 so that the tilting gears 56, 57 are engaged with the tilting gears 54 and 55 respectively.

On the lower surface of the tilt detecting piece 23, a ring-shaped reflection mirror is arranged. At positions face-to-face to the tilt detecting piece 23, a given number (4 in the present embodiment) of optical sensors 24a, 24b, 24c and 24d are arranged, each of which comprises a set of light emitting elements and photodetector elements on the same circumferential periphery around the shaft of the laser projector when the casing 5 and the laser projector 10 are positioned perpendicularly to each other.

From the head 11 of the laser projector 10, tilting arms 25 and 26 are extended in horizontal directions and perpendicularly to each other. The tilting arms 25 and 26 are passed through the conical surface of the recess 6 and are positioned inside the casing 5, and engaging pins 27 and 28 are protruded at forward ends of the tilting arms 25 and 26. The engaging pins 27 and 28 are designed in cylindrical shape, and the axes of the cylinders run perpendicularly to each other and are included in a plane, which passes through the center of the spherical portion 11a. One of the engaging pins 27 and 28, e.g. the engaging pin 27, is restricted to move in horizontal direction so that it can be moved only in the vertical direction. Although not shown in the figure, the engaging pin 27 is slidably engaged in a guide groove extending in the vertical direction, or the engaging pin 27 is slidably pressed against the wall surface extending in the vertical direction by a,resilient means such as a spring.

Shelf plates 29 and 30 are provided on inner wall of the casing 5. A level adjusting motor 31 is arranged on the shelf plate 29, and a level adjusting motor 32 is arranged on the shelf plate 30. A driving gear 33 is engaged on the pivot shaft of the level adjusting motor 31, and the driving gear 34 is engaged on the level adjusting motor 32. A screw shaft 35 running perpendicularly to the engaging pin 27 and bridging over the ceiling of the casing 5 and the shelf plate 29 is rotatably arranged. A driven gear 36 is engaged on the screw shaft 35, and the driven gear 36 is also engaged with the driving gear 33. A slide nut 37 is engaged with the screw shaft 35, and a pin 38 is protruded on the slide nut 37, and the pin 38 is slidably brought into contact with the engaging pin 27.

Similarly, a screw shaft 39 running perpendicularly to the engaging pin 28 and bridging over the ceiling of the casing 5 and the shelf plate 30 is rotatably arranged. A driven gear 40 is engaged with the screw shaft 39, and the driven gear 40 is also engaged with the driving gear 34. A slide nut 41 is engaged with the screw shaft 39, and a pin 42 is protruded on the slide nut 41, and the pin 42 is slidably brought into contact with the engaging pin 28.

A spring receptacle 43 is provided between the ceiling of the casing 5 and the screw shaft 35 or the screw shaft 39, and a spring 44 is placed between the spring receptacle 43 and the laser projector 10 so that the laser projector 10 is pushed clockwise around the support seat 7 in FIG. 28.

In the figure, reference numeral 45 represents a battery box to accommodate a battery for driving the laser survey instrument. The main unit 4 of the laser survey instrument is mounted on a tripod (not shown) via leveling bolts 46 for leveling. Reference numeral 47 represents a glass window encircling the mirror holder 13.

FIG. 33 is a block diagram for a control unit of the above conventional type instrument.

Detection results of the fixed bubble tube 20 and the arbitrary angle setting bubble tube 65 are inputted to an angle detection circuit 87 via a switching circuit 85, and detection results of the fixed bubble tube 21 and the arbitrary angle setting bubble tube 66 are inputted to an angle detection circuit 88 via a switching circuit 86. On the angle detection circuits 88 and 87, reference angles 92 and 91 are set respectively. The reference angles 91 and 92 are usually 0° respectively.

When a signal from the fixed bubble tube 20 is inputted to the angle detection circuit 87 by the switching circuit 85, the angle detection circuit 87 detects a deviation from the reference angle 91, and the signal of the angle detection circuit 87 is inputted to a motor controller 89. Then, the level adjusting motor 31 is driven and controlled by the motor controller 89.

When signals from the fixed bubble tube 20 and the arbitrary angle setting bubble tube 65 are inputted to the angle detection circuit 87 by the switching circuit 85, the angle detection circuit 87 issues a signal corresponding to the deviation. This signal is inputted to a tilt driving circuit 83, and the tilting motor 58 is driven and controlled by the tilt driving circuit 83. When a signal from the arbitrary angle setting bubble tube 65 is inputted to the angle detection circuit 87 by the switching circuit 85, the angle detection circuit 87 detects the deviation from the reference angle 91, and the signal of the angle detection circuit 87 is inputted to the motor controller 89. Then, the level adjusting motor 31 is driven and controlled by the motor controller 89.

The signal of the angle detection circuit 88 is inputted to a motor controller 90, and the level adjusting motor 32 is driven and controlled by the motor controller 90. A signal from the angle detection circuit 88 and a signal from an arbitrary angle setter 82 are inputted to a tilt driving circuit 84, and the tilting motor 59 is driven and controlled by the tilt driving circuit 84.

The angular deviations of the angle detection circuits 87 and 88 are inputted to a discriminator 93. The discriminator 93 selects a higher angular deviation from the angular deviations of the angle detection circuits 87 and 88 and issues an output corresponding to the selected angular deviation change to a display unit driver 94, which displays a value corresponding to the deviation on a display unit 95.

A reference plane formed by laser beam can be set in horizontal direction or at any angle. In the following, description will be given on the leveling operation of the laser survey instrument to form the horizontal reference plane.

When the main unit 4 is installed and no adjustment is made yet, the axis of the laser projector 10 is generally not aligned with the vertical line, and the fixed bubble tubes 20 and 21 are not in horizontal position. The switching circuits 85 and 86 operate in such manner that the signals from the fixed bubble tubes 20 and 21 are inputted to the angle detection circuits 87 and 88.

If it is assumed that the reference angles 91 and 92 are 0° respectively, angular deviation signals are outputted from the angle detection circuits 87 and 88. When the angular deviation signals are outputted, the motor controllers 89 and 90 drive the level adjusting motors 31 and 32 in a given direction so that the angular deviation signals are turned to 0.

The operation relating to the level adjusting motors 31 and 32 is now described, taking an example in the case of the level adjusting motor 31.

When the level adjusting motor 31 is driven, rotation of the level adjusting motor 31 is transmitted to the screw shaft 35 via the driving gear 33 and the driven gear 36, and the slide nut 37 is moved up or down by rotating the screw shaft 35. The upward or downward movement of the slide nut 37 is transmitted to the tilting arm 25 via the pin 38 and the engaging pin 27, and the laser projector 10 is tilted.

As described above, the movement of the engaging pin 27 is restricted in horizontal direction and it is allowed to move only in vertical direction. Thus, tilting direction of the laser projector 10 is restricted and it is tilted around the axis of the engaging pin 28, which runs through the center of the spherical portion 11a. Next, when the level adjusting motor 32 is driven, the screw shaft 39 is rotated, and the engaging pin 28 is moved up or down via the pin 42.

Because the horizontal movement of the engaging pin 27 is restricted by a groove (not shown) and its vertical movement is restricted by the pin 38 and the spring 44, the engaging pin 27 is allowed only to rotate around the axis of the engaging pin 27, which runs through the center of the spherical portion 11a.

When the pin 42 is moved up or down, a change in vertical movement is given to the engaging pin 28 with sliding movement in axial direction between the pin 42 and the engaging pin 28, and the laser projector 10 is tilted around the axis of the engaging pin 27. As described above, the cross-section of the engaging pin 27 is circular. Thus, the tilting of the axis of the engaging pin 27 is not changed when the engaging pin 27 is rotated. That is, tilting by the level adjusting motors 31 and 32 give no influence on the other tilting axes, i.e. the tilting of the axes of the engaging pins 27 and 28. Therefore, tilting adjustment of one axis can be performed independently from the tilting adjustment of the other axis, and the operation of tilting adjustment and control sequence relating to the operation of the tilting adjustment can be extensively simplified.

Because the laser projector 10 is pushed clockwise in FIG. 28 by the spring 44, the laser projector 10 accurately follows the movement of the slide nut 37.

In the tilting operation of the laser projector 10, the support of the laser projector 10 is stable because the spherical portion 11a of the laser projector 10 is supported at three points via the projections 9. Because it is the contact between the spherical portion 11a and the projections 9 having smooth curved surfaces, the laser projector 10 is smoothly moved in any tilting direction, and the posture of the laser projector 10 can be easily adjusted and controlled.

When the laser projector 10 is tilted and leveling operation proceeds, the detection values from the fixed bubble tubes 20 and 21 are brought closer to horizontal. Finally, angular deviations issued from the motor controllers 89 and 90 are turned to 0, and leveling operation is completed.

Detection range of the fixed bubble tubes 20 and 21 is narrow, and saturation status occurs when it exceeds the predetermined range. Thus, tilting direction can be detected, but the value of the tilting angle cannot be detected. Therefore, the optical sensors 24a, 24b, 24c and 24d are provided so that the adjusting mechanism, comprising the level adjusting motors 31 and 32, the driving gears 33 and 34, the driven gears 36 and 40, the screw shafts 35 and 39, the slide nuts 37 and 41, and the tilting arms 25 and 26, is not moved beyond the mechanical adjusting range. Namely, when the limit of the mechanical adjusting range is reached, the light emitted from one of the optical sensors 24a, 24b, 24c and 24d is reflected by the reflection mirror arranged on the tilt detecting piece 23 and is detected by the optical sensor. As a result, the reaching at the limit of the mechanical adjusting range is detected, and the level adjusting motors 31 and 32 are stopped, or it is displayed on the display unit or a buzzer alarm is issued.

In such case, rough adjustment is made to fall in the adjusting range by utilizing the leveling bolts 46, and leveling operation will be started again.

When the leveling operation is completed, laser beam is emitted from the laser projector 10. Further, the scanning motor 15 is driven to rotate the laser projector 10 around the vertical axis, and laser beam is irradiated in horizontal direction through the pentagonal prism 18. By rotating it further, a horizontal reference plane is formed by the laser beam.

In the process of the leveling operation, some time is required from the starting to the completion of leveling. During this period, the progress of the leveling operation is displayed for the operator to inform that the leveling operation is being performed adequately and to eliminate the sense of uneasiness of the operator.

The magnitude of angular deviation issued from the angle detection circuits 87 and 88 is judged by the discriminator 93, and higher angular deviation is selected. The change of the selected angular deviation is outputted to the display unit driver 94, and the content of the display is altered according to the change of the angular deviation. Then, it is displayed on the display unit 95.

The higher angular deviation is selected because more time is required for angular adjustment of higher angular deviation. Instead of selecting magnitude of angular deviation, the sum of the angular deviations outputted from the angle detection circuits 87 and 88 may be obtained and the content of the display may be changed according to the sum of the angular deviations.

FIG. 34 is a diagram showing relationship between angular deviation and time. Based on this relationship, a position to change the display content is set in advance. When the angular deviation reaches the preset position, the display is switched over, and the progress of the leveling operation is notified to the operator.

Next, description is given on the case where the reference plane formed by the laser beam is set at an arbitrary angle after the horizontal reference plane is formed as described above.

The numerical values to tilt the reference plane by the arbitrary angle setters 81 and 82 are inputted to the tilt driving circuits 83 and 84 respectively.

It is determined whether or not the detection results of the fixed bubble tube 20 and the arbitrary angle setting bubble tube 65 are identical with those of the fixed bubble tube 21 and the arbitrary angle setting bubble tube 66, and these are made identical with each other. In this case, it is preferable that the fixed bubble tubes 20 and 21 are in horizontal position, whereas these may not be in horizontal position and it will suffice if these are not in saturation status.

When the outputs from the fixed bubble tubes 20 and 21 and the arbitrary angle setting bubble tubes 65 and 66 are identical with each other, the arbitrary angle setting bubble tubes 65 and 66 are tilted at the angles as set by the arbitrary angle setters 81 and 82, and the laser projector 10 is tilted so that the arbitrary angle setting bubble tubes 65 and 66 are turned to horizontal position. Then, the rotation axis of the laser projector 10 for forming an arbitrary angle reference plane can be obtained. Thus, when the laser projector 10 is rotated to form a reference plane, the laser beam reference plane is formed as desired.

Further, more concrete description will be given below. Because the angle setting operation for the arbitrary angle setting bubble tube 65 is similar to the angle setting operation for the arbitrary angle setting bubble tube 66, description will be given below only for the arbitrary angle setting bubble tube 65.

A switching signal is inputted to the switching circuit 85 from an input unit or a control unit (not shown), and a signal from the fixed bubble tube 20 and a signal from the arbitrary angle setting bubble tube 65 are inputted to the angle detection circuit 87. In case deviation of angles detected by the fixed bubble tube 20 and the arbitrary angle setting bubble tube 65 is obtained in the angle detection circuit 87, and if a deviation is present, this deviation signal is inputted to the tilt driving circuit 83.

The tilt driving circuit 83 drives the tilting motor 58. When the tilting motor 58 is driven, the tilting gear 56 is rotated, and the rotation of the tilting gear 56 is transmitted to the tilting screw 52 via the tilting gear 54, and the tilting nut 48 is moved up or down in a given direction. When the nut pin 50 of the tilting nut 48 is engaged with the tilting pin 60, the tilting plate 62 is tilted in such a direction that the deviation is turned to 0.

The tilting of the tilting plate 62 is detected by the arbitrary angle setting bubble tube 65 and is further inputted to the angle detection circuit 87 via the switching circuit 85.

By the angle detection circuit 87, deviation of the detected angles of the fixed bubble tube 20 and the arbitrary angle setting bubble tube 65 is sequentially calculated, and the detected angular deviation is fed back to the tilt driving circuit 83, and the tilting motor 58 is driven until the detected angular deviation is turned to 0.

When the detected angular deviation is 0, the axis of the laser projector 10 runs perpendicularly to the plane detected by the arbitrary angle setting bubble tubes 65 and 66.

Next, the preset angle is inputted to the tilt driving circuit 83 by the arbitrary angle setter 81, and the tilting reference plane setting operation is started.

In the tilt driving circuit 83, the tilting motor 58 is driven so that the angle corresponding to the preset angle inputted by the arbitrary angle setter 81 is reached, and the tilting plate 62 is tilted in a direction reverse to the tilting reference plane to be obtained.

Here, for example, a pulse motor is used as the tilting motor 58, and the tilting angle of the tilting plate 62 and the number of pulses of the pulse motor required for the tilting are stored in the tilt driving circuit 83 in advance. Then, the number of pulses corresponding to the angle set by the arbitrary angle setter 81 is outputted to drive the tilting motor 58.

The tilting screw 52 is rotated by the tilting motor 58, and the tilting nut 48 is moved in a given direction, e.g. in downward direction.

The movement of the tilting nut 48 is transmitted to the tilting plate 62 via the nut pin 50 and the tilting pin 60 as described above, and the tilting plate 62 is tilted counterclockwise in FIG. 28 around the ball 67.

As already described, the tilting pin 60 is guided by the guide pin 71 and is tilted only in vertical direction. Accordingly, the tilting of the tilting pin 60 gives no influence on the tilting of the arbitrary angle setting bubble tube 66.

When the tilting plate 62 is tilted, the output value from the angle detection circuit 87 is changed, and the comparison result calculated by the tilt driving circuit 83 decreases.

When the comparison result is turned to 0, the driving of the tilting motor 58 is stopped, and the tilting setting operation of the tilting plate 62 is completed. The signal of this completion is also inputted to the switching circuit 85, and the circuit is switched over in such manner that only the signal from the arbitrary angle setting bubble tube 65 is inputted to the reference angle 91.

The tilting operation relating to the arbitrary angle setting bubble tube 66 is also performed in similar manner. Because the tilting pin 60 is guided by the guide pin 71 as described above, the tilting operation of the arbitrary angle setting bubble tube 66 gives no influence on the arbitrary angle setting bubble tube 65. Therefore, the tilting operations in two directions of the tilting plate 62 can be independently controlled, and control sequence relating to the two-direction tilting operation of the tilting plate 62 is simple.

When the tilting setting operation of the tilting plate 62 is completed, tilting operation of the laser projector 10 is started based on the detection results of the arbitrary angle setting bubble tube 65 in order to set the tilting reference plane. The setting operation of the tilting of the laser projector 10 is performed in such manner that the detection results of the arbitrary angle setting bubble tube 65 are in a horizontal direction. Because this operation is similar to the case where leveling operation is performed based on the fixed bubble tubes 20 and 21, detailed description is not given here.

FIG. 32 represents the status where the setting operation of the tilting reference plane has been completed. When the setting operation of the tilting reference plane is completed, the tilting plate 62 is in horizontal position.

The concurrent operation of the fixed bubble tube 20 and the arbitrary angle setting bubble tube 65 is carried out to guarantee the accuracy of the tilting operation of the tilting plate 62. This may be performed each time the tilting operation is carried out or after it has been repeated by the predetermined times.

FIG. 35 represents an example of a controller 96 incorporated with the arbitrary angle setters 81 and 82. The tilting of the tilting plate 62 is supported by the tilting of two axes (X and Y), and the preset numerical values are displayed on the display units 97 and 98.

In the above, it is described that adjustment has been already completed as to in which direction the reference plane formed by laser beam should be tilted. In fact, accurate setting must be made first in a desired direction (horizontal direction), in which the main unit 4 of the laser survey instrument should be tilted.

In the past, to perform the setting operation to set the main unit in a direction to be tilted, a collimator 75 arranged on the upper surface of the main unit 4 as shown in FIG. 28 has been used. Tilting direction of the tilt setting mechanism in the main unit is set in parallel to longitudinal direction of the bubble tube, which sets and detects the tilting, and mechanical arrangement is made in such manner that collimating direction of the collimator 75 is also in parallel to the tilt setting mechanism. The direction of the main unit is also aligned with the tilt setting mechanism. The operation to set the collimator 75 in a direction to be tilted is to rotate or move the main unit and to turn the tilting direction of the tilt setting mechanism in the main unit and the bubble tube toward the predetermined direction. In the meantime, the main unit is usually mounted on a tripod, and description will be given now on the operation on the tripod.

A target (not shown) is installed in advance in a direction, in which the tilting should be set, and by directing the main unit of the laser survey instrument in a direction accurately facing to the target using the collimator 75, main unit 4 can be set in the direction, in which it is to be tilted.

The screws (not shown) fixing the main unit 4 are loosened, and the main unit 4 is rotated. The target is collimated from the collimator 75, and the direction of the main unit 4 is accurately set toward the target.

As it is evident from the above description, the horizontal line is used as reference in the setting of an internal tilt angle (an angle of elevation) in a series of setting operations for the laser survey instrument, and it is performed according to tilting information electrically detected by a tilt detector such as bubble tube. Thus, there will be no man-made error by the surveyor. As a result, tilt angle can be set at high accuracy.

On the other hand, in the operation to set the main unit 4 in a direction to be tilted, the collimator 75 is used, and it is up to personal judgment of the surveyor to decide whether it is aligned or not. Further, the collimator 75 requires no high technical skill to collimate, and unlike a collimating telescope, collimating accuracy is not high. For this reason, the setting by means of the collimator 75 does not give high accuracy in the setting of the direction because of low accuracy of the collimator 75 itself and of the man-made error.

In conventional type civil engineering work, which does not necessarily require high accuracy, there has been no special problem in the direction setting using the collimator 75, whereas, in the highly mechanized civil engineering work in recent years, the problem of accuracy arises.

SUMMARY OF THE INVENTION

It is an object of the present invention to provide a laser survey instrument, by which it is possible to perform the setting of the laser survey instrument at high accuracy in case angle of elevation is to be set for the laser survey instrument, and further, it is possible to perform automatically more accurate setting of tilt angle by eliminating man-made error.

To attain the above object, the laser survey instrument according to the present invention comprises at least a main unit for emitting a laser beam and an object reflector for reflecting the laser beam from the main unit toward the main unit, wherein the main unit comprises an emitter for emitting the laser beam, a rotating unit for rotating and scanning the laser beam, a tilting mechanism for tilting the laser beam at an arbitrary angle at least in one direction with respect to a horizontal plane, a rotating angle detector interlocked with the rotating unit and for detecting irradiating direction of the laser beam, a reflection light detector for detecting reflection light from the object reflector, and an alignment display unit for detecting a deviation of direction with respect to the object reflector based on a signal from the reflection light detector and for obtaining information on the deviation of direction, whereby the reflection light detector detects the position of the center of gravity of the reflected photodetection signal and to identify the center of the object reflector, or the emitter modulates the laser beam and the reflection light detector is provided with a filter for detecting the modulated laser beam, or in case the laser beam entering the object reflector is circularly polarized light, the object reflector comprises a polarized light maintaining reflecting surface for reflecting the light while maintaining circularly polarized light of the incident laser beam and a polarized light converted reflecting surface for reflecting the light in circularly polarized light different from the circularly polarized light of the incident laser beam, the emitter of the main unit emits laser beam of circularly polarized light, and the reflection light detector separates the laser beam of the emitted circularly polarized light from the laser beam of circularly polarized light different from the emitted circularly polarized light and detects the boundary between two reflecting surfaces of the object reflector, or the main unit is provided on a main unit rotator, and the main unit rotator can rotate the main unit around a vertical axis, or the main unit is provided on a main unit rotator, and the main unit rotator can rotate the main unit around a vertical axis, or the alignment display unit is provided with a display unit for displaying a calculated deviation of direction of the main unit with respect to the object reflector, or the alignment display unit is provided with a rotation controller for controlling the main unit rotator in such manner that the main unit is accurately directed toward the object reflector based on a calculated deviation of direction of the main unit with respect to the object reflector, or the rotating angle detector is an encoder and the encoder has at least one index, or there is provided an optical means for emitting the laser beam in two directions, i.e. upward and downward directions, from the emitter, or a width of a reflection layer formed on the object reflector is gradually changed in vertical direction, or the width of the reflection layer formed on the object reflector has an extreme value at a given position in vertical direction, or the object reflector has reflection layers divided into two portions, and widths of the two reflection layers are changed as positions are changed in vertical direction, or the object reflector has a plurality of belt-like reflection layers, and a plurality of pulse-like laser beams are reflected in case the object reflector is irradiated and scanned, or in case the laser beam entering the object reflector is circularly polarized light, the object reflector has a polarized light maintaining reflecting surface for reflecting the light while maintaining the circularly polarized light of the incident laser beam and a polarized light converted reflecting surface for reflecting the light in circularly polarized light different from the circularly polarized light of the incident laser beam, and widths of the two reflecting surfaces are changed as the positions are changed in vertical direction, or irradiating and scanning position of the object reflector is moved in vertical direction, and the reflection light detector detects the center or a target in vertical direction based on the change in width of the laser beam reflected from the object reflector, or a tilt angle from the horizontal plane is displayed on a display unit based on output from the tilting mechanism corresponding to the tilting of the tilting mechanism in case the target center of the object reflector is detected, or the object reflector has reflection layers divided into upper and lower portions, and the target center in vertical direction is detected by determining the position of the center of gravity of the laser beam reflected from the object reflector as obtained in case the laser beam is irradiated and scanned with respect to the object reflector in vertical direction, or there is provided a manual setting mechanism for manually performing tilt setting of the tilting mechanism.

DETAILED DESCRIPTION OF THE PREFERRED EMBODIMENTS

Figure 1:
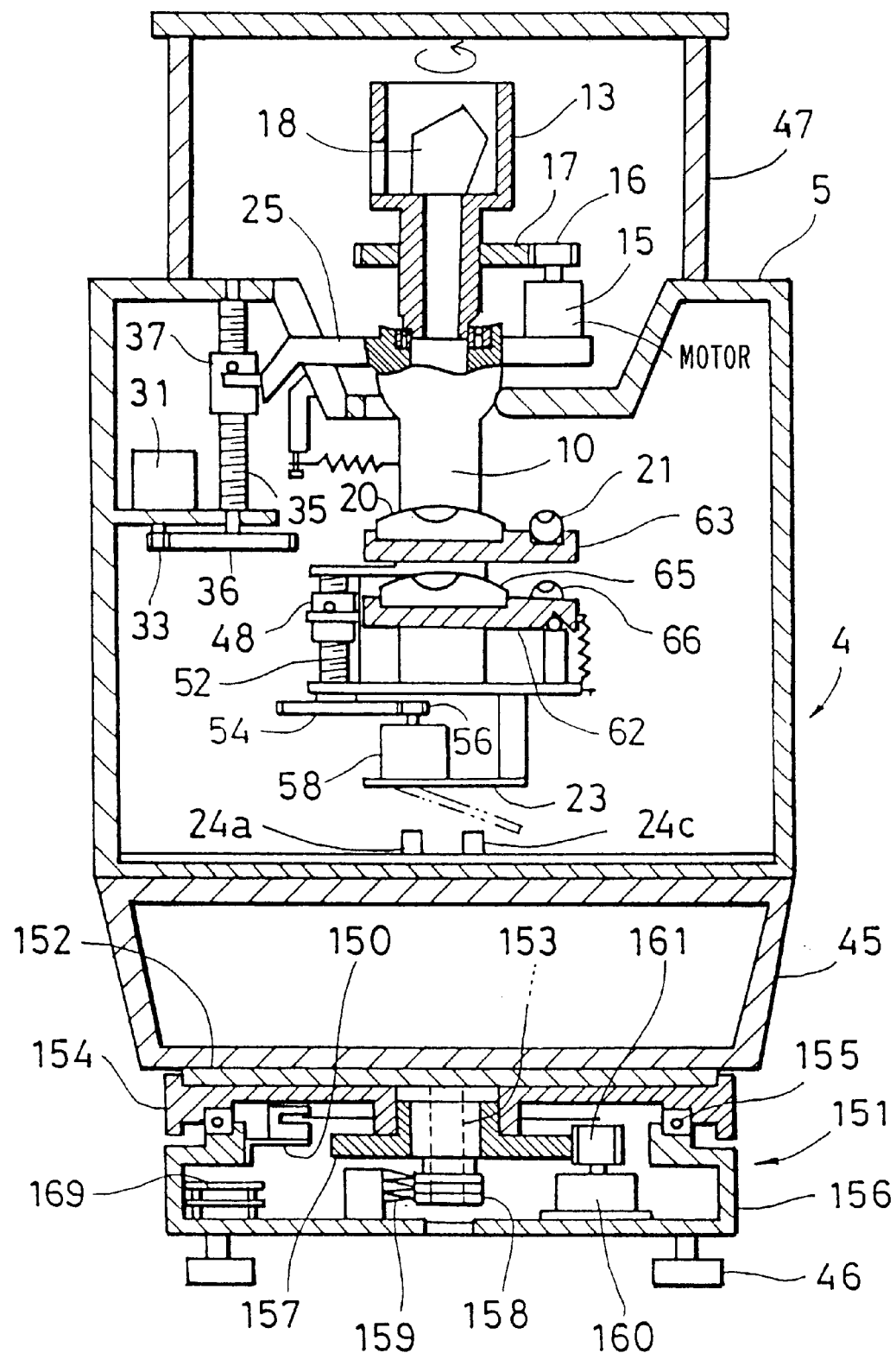
FIG. 1 is a cross-sectional view of a mechanical portion of an embodiment of the present invention.

In the following, description will be given on an embodiment of the present invention referring to the drawings.

Figure 2:
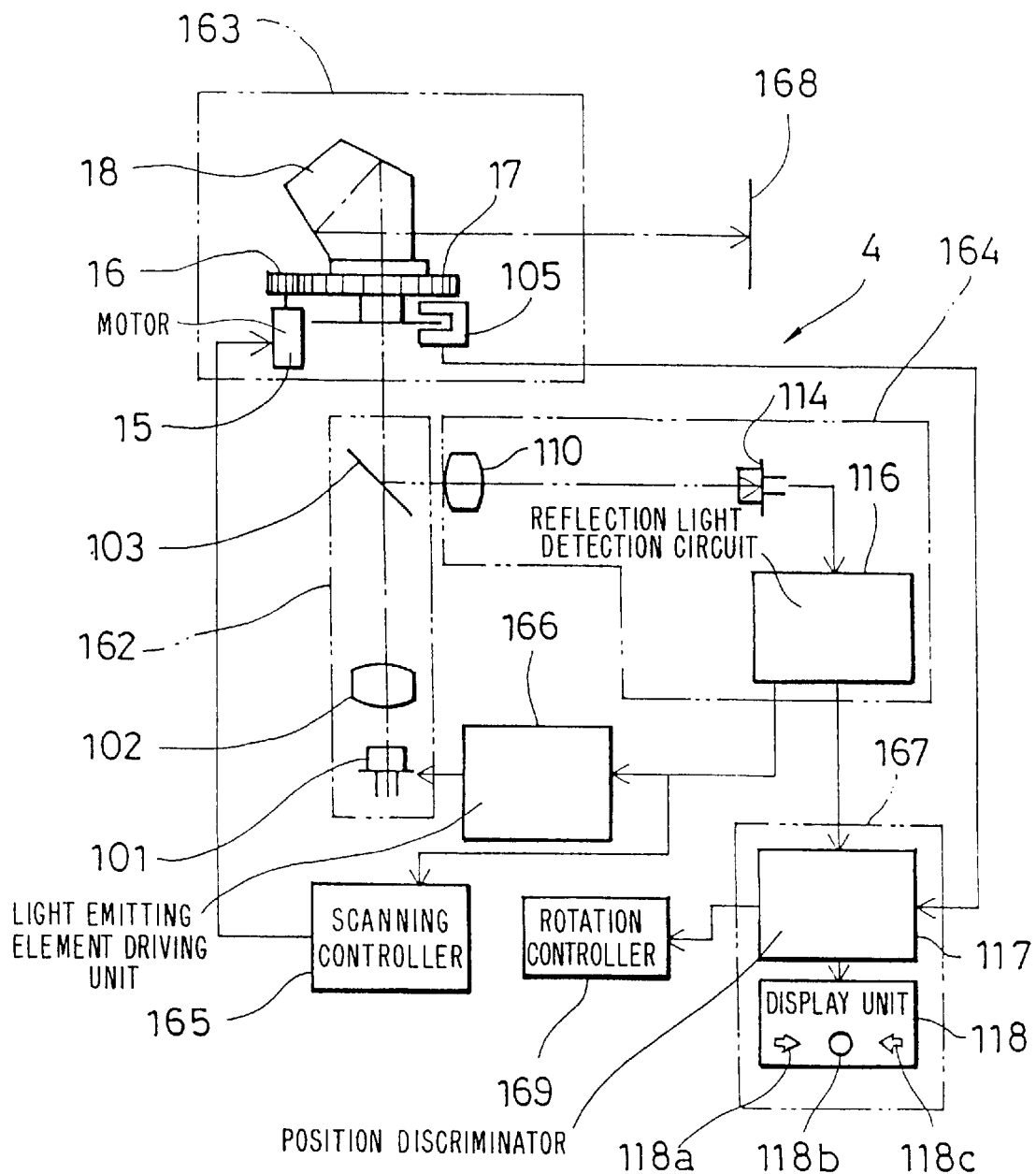
FIG. 2 is a block diagram of an optical system and a control system of the above embodiment.

In the present invention, an object (an object reflector 168) is placed in a direction to be tilted, and a main unit 4 itself recognizes the tilting, and direction of tilting of the main unit 4, or substantially tilting of a tilt setting mechanism, with respect to the object reflector 168 is corrected. In FIGS. 1 and 2, the same component as in FIGS. 28 to 35 is referred by the same symbol, and detailed description is not given here.

First, the mechanical portion will be described referring to FIG. 1. A main unit rotator 151 is mounted under a battery box 45. Description is now given on the main unit rotator 151.

A rotation base 152 is fixed on the lower surface of the battery box 45, and a rotating shaft 153 is protruded downward from the rotation base 152. A rotation frame 154 is fixed on the rotation base 152, and the rotation frame 154 is rotatably mounted on a hollow fixed frame 156 via a bearing 155. The rotating shaft 153 passes through the rotation frame 154. A rotating gear 157 is fixed on the rotating shaft 153, and a slip ring 158 is engaged on the forward end of the rotating shaft 153. A contact 159 contacts the slip ring 158, and driving electric power and control signals are supplied from the main unit via the slip ring 158 and the contact 159. A rotating motor 160 is arranged on the bottom surface of the fixed frame 156, and an output gear 161 engaged with an output shaft of the rotating motor 160 is engaged with the rotating gear 157. An encoder 150 is arranged between the rotation frame 154 and the fixed frame 156, and an angle between the rotation frame 154 and the fixed frame 156, i.e. relative rotating angle of the main unit 4 with respect to the fixed frame 156, is detected by the encoder 150, and the rotating angle thus detected is inputted to a rotation controller 169. The rotating motor 160 is driven by the rotation controller 169, and rotation is controlled.

On the lower surface of the fixed frame 156, bolt holes (not shown) for mounting on a tripod are formed, and the fixed frame 156 is mounted on the tripod (not shown) via the bolt holes. Reference numeral 46 represents a bolt for leveling adjustment.

Next, description will be given on optical and control systems in connection with FIG. 2.

The main unit 4 comprises an emitter 162, a rotating unit 163, a reflection light detector 164, a scanning controller 165, a light emitting element driving unit 166, and an alignment display unit 167.

First, the emitter 162 is described.

On the optical axis of a laser diode 101, a collimator lens 102 and a perforated mirror 103 are arranged in this order as seen from the laser diode 101. Laser beam emitted from the laser diode 101 is turned to parallel beams through the collimator lens 102, and the beams are directed toward the rotating unit 163 through the perforated mirror 103. Light beam is emitted from the laser diode 101 by the light emitting element driving unit 166. The light is modulated by the light emitting element driving unit 166, and the laser beam emitted from the laser diode 101 can be discriminated from the other external light.

The rotating unit 163 directs the laser beam emitted from the emitter 162 in horizontal direction for scanning. A pentagonal prism 18 for deflecting optical axis of the laser beam from the emitter 162 by an angle of 90° is supported in such manner that it can be rotated around the optical axis of the emitter 162. Further, it is rotated by the scanning motor 15 via a gear 16 and a scanning gear 17. An encoder 105 is provided with respect to the rotating shaft of the pentagonal prism 18.

The encoder 105 comprises a rotor 109 and a detector 107, and it is an incremental encoder equipped with an index 108 for showing a reference position (FIG. 5). By counting an output from the reference position given by the index 108, an angle from the reference position can be detected. The index 108 for showing the reference position is arranged in such manner that it is detected by the detector 107 when irradiating direction of the rotating laser beam is aligned with tilting direction of the tilt setting mechanism, i.e. when the laser beam is in parallel to the arbitrary angle setting bubble tube 65.

The object reflector 168 reflects the laser beam toward the rotating unit 163 when the laser beam emitted from the rotating unit 163 is irradiated. The object reflector 168 is shown, for example, in FIGS. 3A and 4A. The object reflector shown in FIG. 3A has a reflection layer 122 on a substrate 121 and reflects the light from the rotating unit 163 so that the light enters the rotating unit 163 again. The reflection layer 122 is a retroreflective surface, comprising beads, very small prisms, etc. In the object reflector shown in FIG. 4A, reflection layers 122 are arranged on two lateral portions of the substrate 121. Thus, there are two reflection layers to easily discriminate between reflection from the object reflector 168 and reflection from unnecessary reflecting object.

Figure 3A:
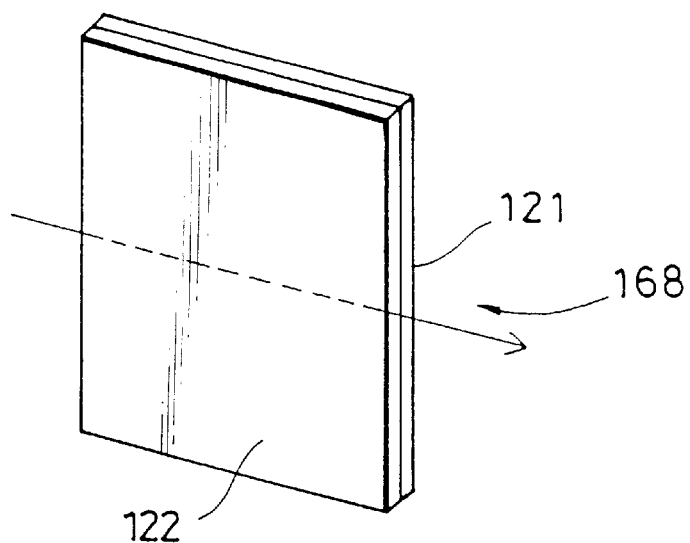
FIG. 3A and FIG. 3B each represents an example of an object reflector.
Figure 3B:
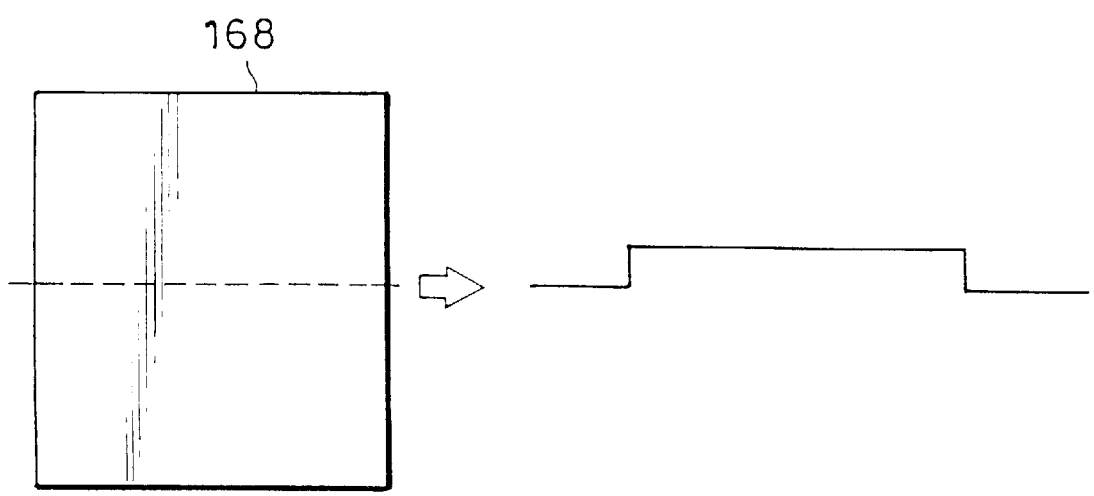
Figure 4A:
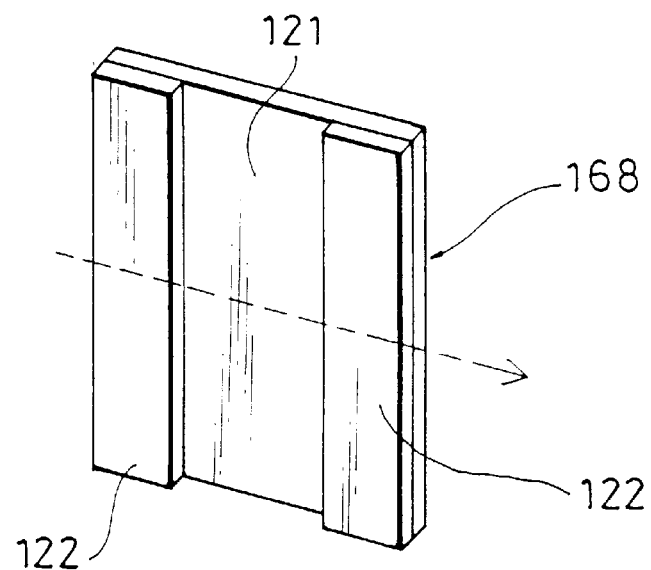
FIG. 4A and FIG. 4B each represents an example of another object reflector.
Figure 4B:
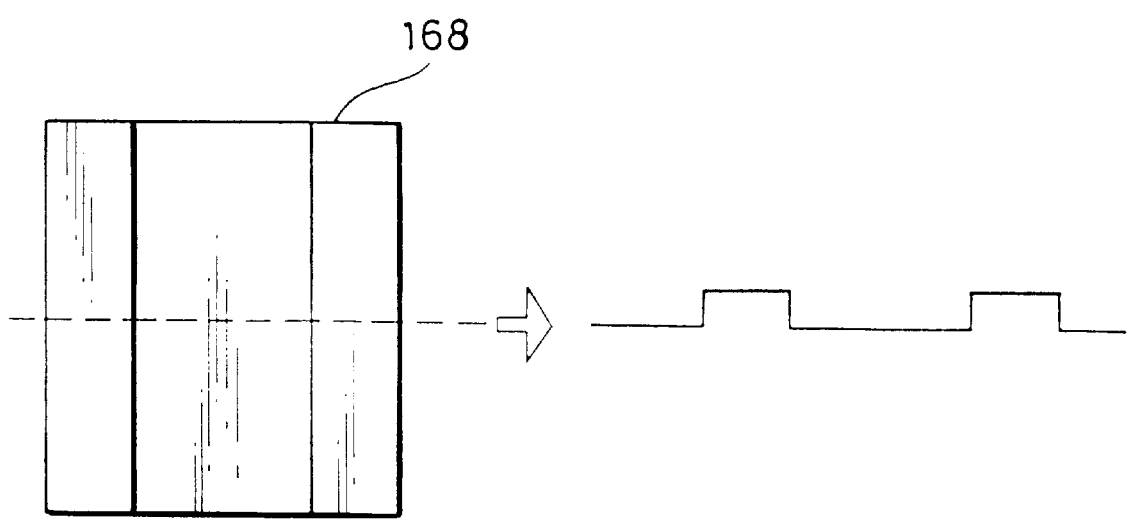

When the object reflector 168 shown in FIG. 3A is scanned by the laser beam, the laser beam reflected from the object reflector 168 is turned to pulse-like beam having the same width as that of the object reflector 168 as shown in FIG. 3B. When the object reflector 168 shown in FIG. 4A is scanned by the laser beam, the laser beam reflected from the object reflector 168 shown in FIG. 4B exhibits two-pulse form varied from the form of the beam of FIG. 3B, lacking the intermediate portion.

The laser beam reflected from the object reflector 168 enters the pentagonal prism 18. Upon entering the pentagonal prism 18, the reflection laser beam is deflected toward the perforated mirror 103, and the perforated mirror 103 directs the reflection laser beam toward the reflection light detector 164.

Next, description will be given on the reflection light detector 164.

On the optical axis of the reflection light from the perforated mirror 103, a condenser lens 110 and a first photodetector 114 comprising a photodiode and the like are sequentially arranged in this order as seen from the perforated mirror 103 so that the first photodetector 114 receives the reflection laser beam from the object reflector 168, and output from the first photodetector 114 is inputted to a reflection light detection circuit 116. The reflection light detection circuit 116 is equipped with an electric filter (not shown) for detecting photodetection signals of the laser beam. Of the photodetection signals from the first photodetector 114, the modulated laser beam is extracted and detected from the other external light. Further, the signal is processed, e.g. amplified, and is outputted to the alignment display unit 167.

The alignment display unit 167 comprises a position discriminator 117 and a display unit 118. A signal showing photodetection status of the first photodetector 114 from the reflection light detection circuit 116 is inputted to the position discriminator 117, and an angle signal from the encoder 105 for detecting rotating position of the pentagonal prism 18 on the rotating unit 163 is inputted. The angle signal from the encoder 105 is an angle signal of the encoder 105 corresponding photodetection status when the reflection laser beam from the object reflector 168 is received. Therefore, by obtaining the signal of the encoder 105 at leading and trailing edges of the signal (FIG. 3B) obtained by receiving the reflection laser beam from the object reflector 168 shown in FIG. 3, and an angle signal from the reference position, it is possible to easily detect the position of the center of gravity of the object reflector 168, and the center of the object reflector 168. Also, for the object reflector 168 shown in FIG. 4, by obtaining the signal of the encoder 105 at leading and trailing edges of the signal (FIG. 4B) obtained by receiving the reflection laser beam, and an angle signal from the reference position, it is possible to detect position of the center of gravity of the object reflector 168, i.e. the center of the object reflector 168.

The position discriminator 117 calculates the position of the center of gravity of the photodetection signal, i.e. the center of the object reflector 168, from the photodetection signal of the reflection light detection circuit 116 and the angle signal of the encoder 105, and the result of the calculation is inputted to the display unit 118 and the rotation controller 169. If the direction of the main unit 4 is deviated, the display unit 118 indicates the corrected direction of the main unit 4 by arrows 118*a* or 118*c*. Further, in case the main unit 4 is accurately positioned face-to-face to the object reflector 168, it is indicated by a display indicator 118*b* at the center.

In the following, description will be given on operation referring to FIG. 5.

Figure 5A:
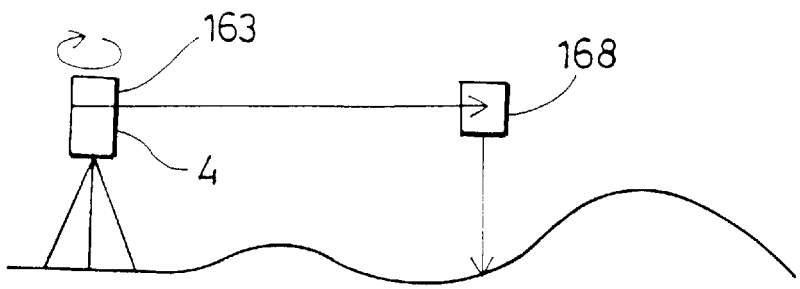
FIGS. 5A, 5B, 5C, 5D, 5E and 5F are drawings for showing operation of the above embodiment.
Figure 5B:
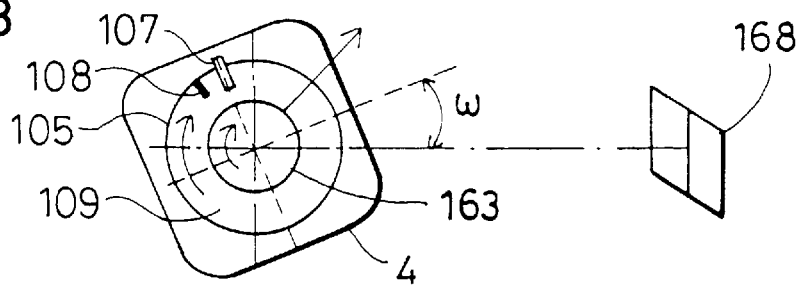

After horizontal leveling operation of the main unit 4 has been completed (FIG. 5A), the rotating unit 163 is rotated by the scanning motor 15, and the laser beam emitted from the emitter 162 is scanned on the horizontal plane. Rotating position of the rotating unit 163 is detected by the encoder 105. On a rotating plate of the encoder 105, which is integrally rotated with the rotating unit 163, a main scale for issuing angle pulses and an index 108 for showing reference position are marked. A detector 107 on the encoder 105 on the fixed side of the main unit 4 issues angle pulses by the main scale and a reference position pulse by the index 108. Mechanical relation between the encoder 105 and the main unit is set in such manner that the laser beam is directed toward the direct front of the main unit 4, or substantially toward tilting direction of the tilt setting mechanism. When the main unit 4 is installed, the main unit 4 is not accurately facing toward the object reflector 168 generally. As shown in FIG. 5B, it is assumed here that the main unit 4 is deviated by an angle of ω counterclockwise in the figure.

Figure 5C:
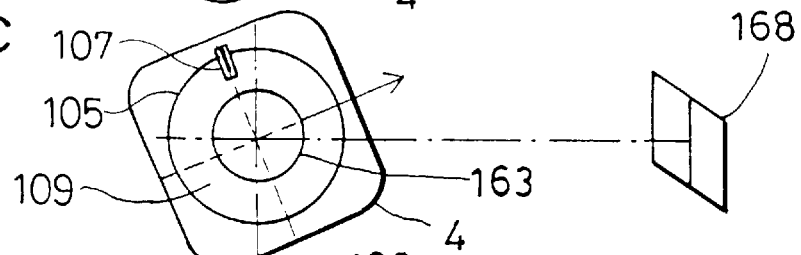
Figure 5D:
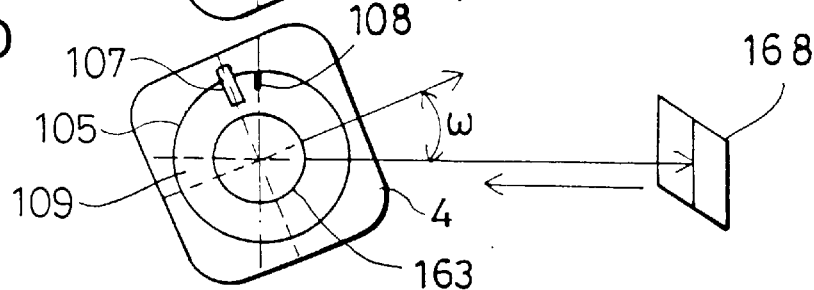
Figure 5E:
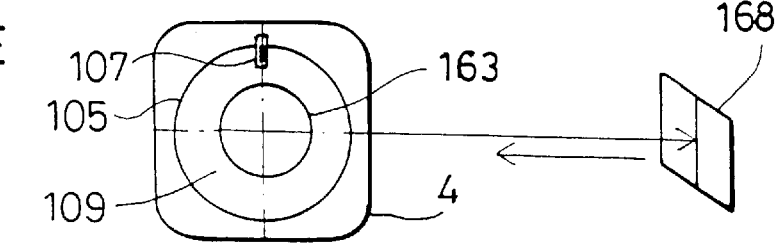

When the laser beam scans the plane and the rotating unit 163 is rotated, the detector 107 detects the index 108. Then, the reference position is confirmed, and a rotating angle of the rotating unit 163 is detected by the encoder 105 from the detected position (FIG. 5C). Further, the rotating unit 163 is rotated, and when the laser beam passes through the object reflector 168, the reflection laser beam from the object reflector 168 enters the reflection light detector 164 via the rotating unit 163 and the perforated mirror 103, and the first photodetector 114 issues photodetection signal. The reflection light detection circuit 116 extracts the photodetection signal containing only the laser beam and outputs it to the position discriminator 117. At the position discriminator 117, the center position of the object reflector 168 is calculated, and an angle signal from the encoder 105 relating to the center position is read. This angle is nothing but a deviation of the direction of the main unit 4 with respect to the object reflector 168, i.e. the angle ω (FIG. 5D). The direction or the amount relating to ω is indicated by the arrow 118a, the display indicator 118b, or the arrow 118c. The angle signal ω is inputted to the rotation controller 169. The rotation controller 169 issues a driving signal to the rotating motor 160 to drive it, and the rotating motor 160 rotates the main unit 4 toward the direction to be corrected via the output gear 161 and the rotating gear 157. The rotating angle of the main unit 4 is detected by the encoder 150, and the rotating motor 160 is stopped when the angle detected by the encoder 150 is turned to ω (FIG. 5E).

Figure 5F:
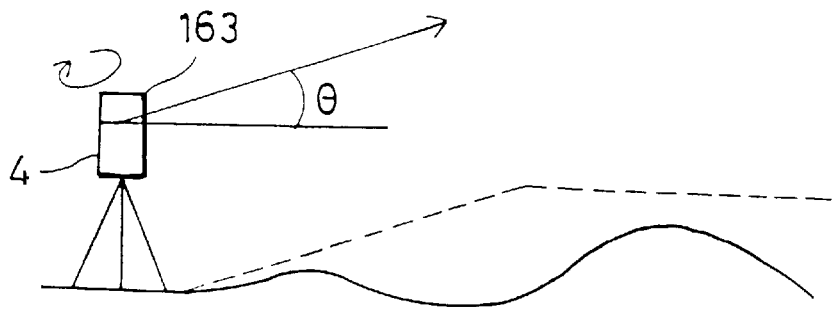

When the main unit 4 is accurately faced toward the object reflector 168, an angle of elevation θ is set, and the scanning motor 15 is driven to irradiate the laser beam for scanning. Then, a reference plane tilted by the angle of elevation θ with respect to the target is formed (FIG. 5F).

The detection of the direction of the main unit 4 is not limited to the encoder 150.

Figure 6:
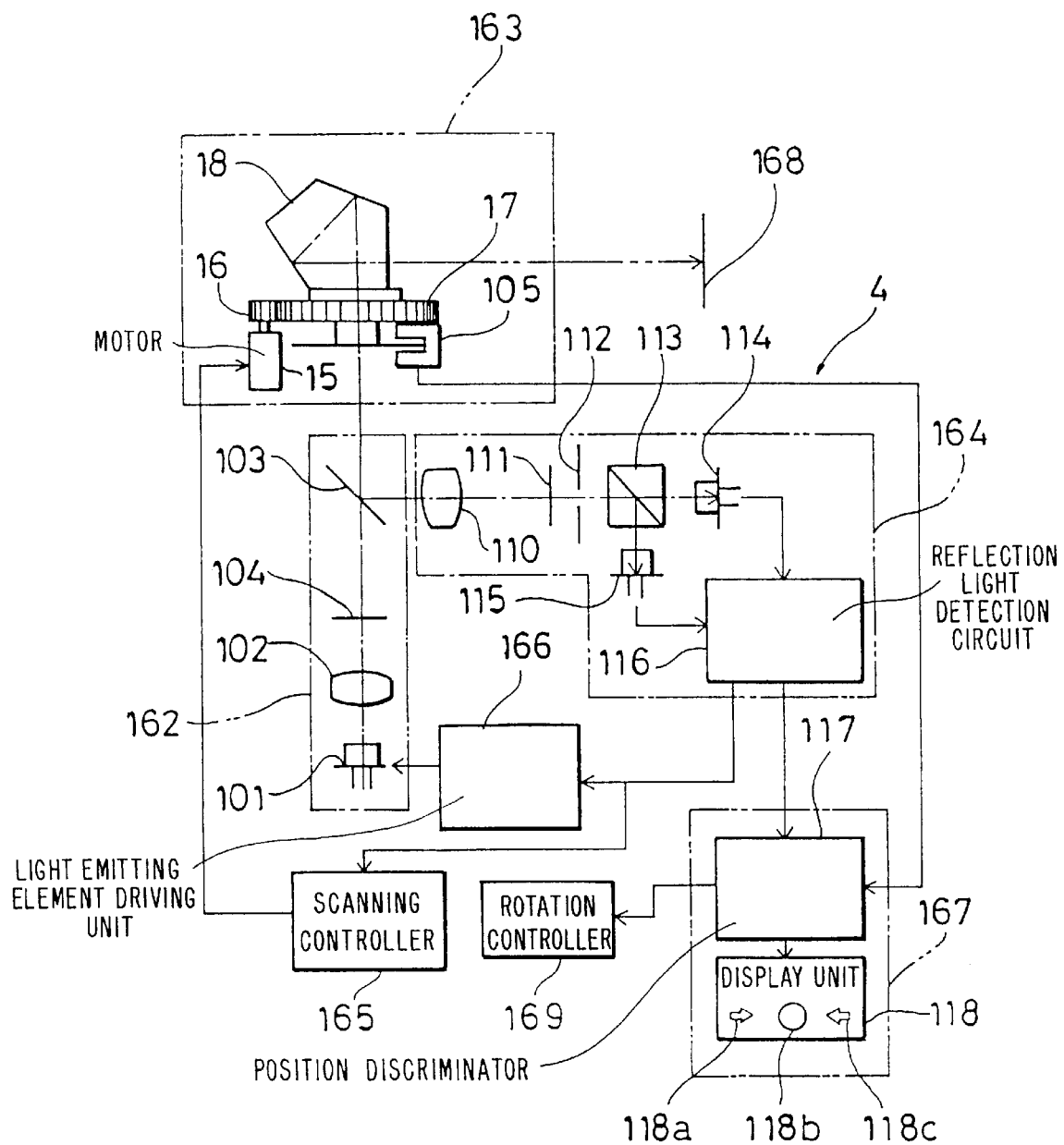
FIG. 6 is a block diagram of an optical system and a control system of a second embodiment of the present invention.
Figure 8:
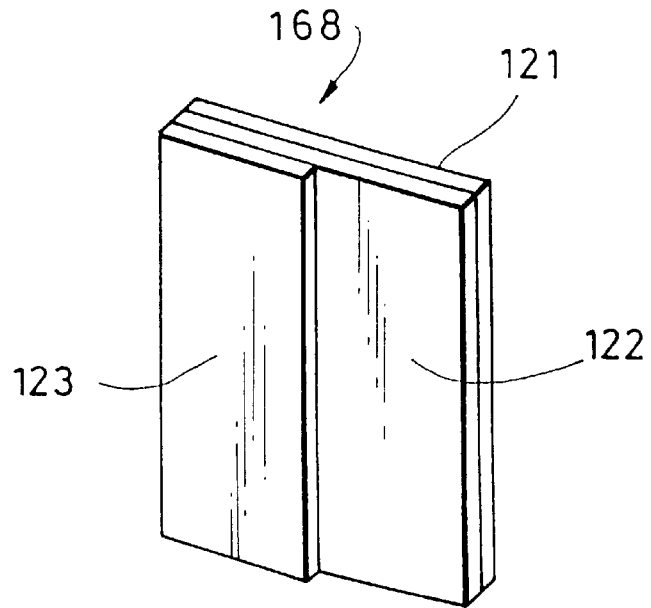
FIG. 8 is a perspective view of an object reflector used in the second embodiment.

Description is now given on a second embodiment referring to FIG. 6. In this second embodiment, the object reflector 168 has a reflection layer 122 formed on a substrate 121 as shown in FIG. 8. On the left half in the figure, a λ/4 birefringence member 123 is attached. Thus, for example, the exposed portion of the reflection layer 122 serves as a polarized light maintaining reflecting unit, which reflects the light while maintaining direction of polarization of the incident light beam, and the λ/4 birefringence member 123 serves as a polarized light converted reflecting unit, which reflects the light while converting direction of polarization from that of the incident light beam, thus giving different directions of polarization.

The reflection layer 122 comprises a retroreflective material, i.e. it has a plurality of very small corner cubes, or spherical object reflectors. The λ/4 birefringence member 123 fulfills such function that the polarized light reflection light beam causes phase difference of λ/4 with respect to the incident light beam.

Next, description will be given on the main unit 4 in the second embodiment.

On the optical axis of a laser diode 101, which emits linearly polarized laser beam, a collimator lens 102, a first λ/4 birefringence member 104 and a perforated mirror 103 are sequentially arranged in this order as seen from the laser diode 101. The linearly polarized laser beam emitted from the laser diode 101 is turned to parallel beams by the collimator lens 102, and the beams are further converted to circularly polarized light by the first λ/4 birefringence member 104. The circularly polarized laser beam is directed toward the rotating unit 163 through the perforated mirror 103. The rotating unit 163 irradiates the laser beam coming from the emitter 162 in horizontal direction for scanning.

The polarized reflection laser beam from the object reflector 168 enters the rotating unit 163. Upon entering the pentagonal prism 18, the polarized light reflection laser beam is deflected toward the perforated mirror 103, and the polarized reflection laser beam is reflected on the perforated mirror 103 and directed toward the reflection light detector 164.

Next, description will be given on the reflection light detector 164.

On the optical axis of reflection light of the perforated mirror 103, a condenser lens 110, a second λ/4 birefringence member 111, a pinhole 112, a polarized light beam splitter 113, and a first photodetector 114 comprising a photodiode and the like are sequentially arranged in this order as seen from the perforated mirror 103, and a second photodetector 115 comprising a photodiode and the like is arranged on reflection optical axis of the polarized light beam splitter 113. Outputs from the first photodetector 114 and the second photodetector 115 are inputted to the reflection light detection circuit 116.

The polarized light beam splitter 113 splits the polarized reflection laser beam entering the reflection light detector 164 and allows the split beams to enter the first photodetector 114 and the second photodetector 115. The second λ/4 birefringence member 111 and the polarized light beam splitter 113 are arranged in such manner that the laser beam emitted from the emitter 162 transmits the λ/4 birefringence member 123 twice and the polarized reflection laser beam returning to the main unit enters the first photodetector 114, and that the laser beam from the reflection layer 122 having a different direction of polarization from that of the above laser beam enters the second photodetector 115.

Figure 7:
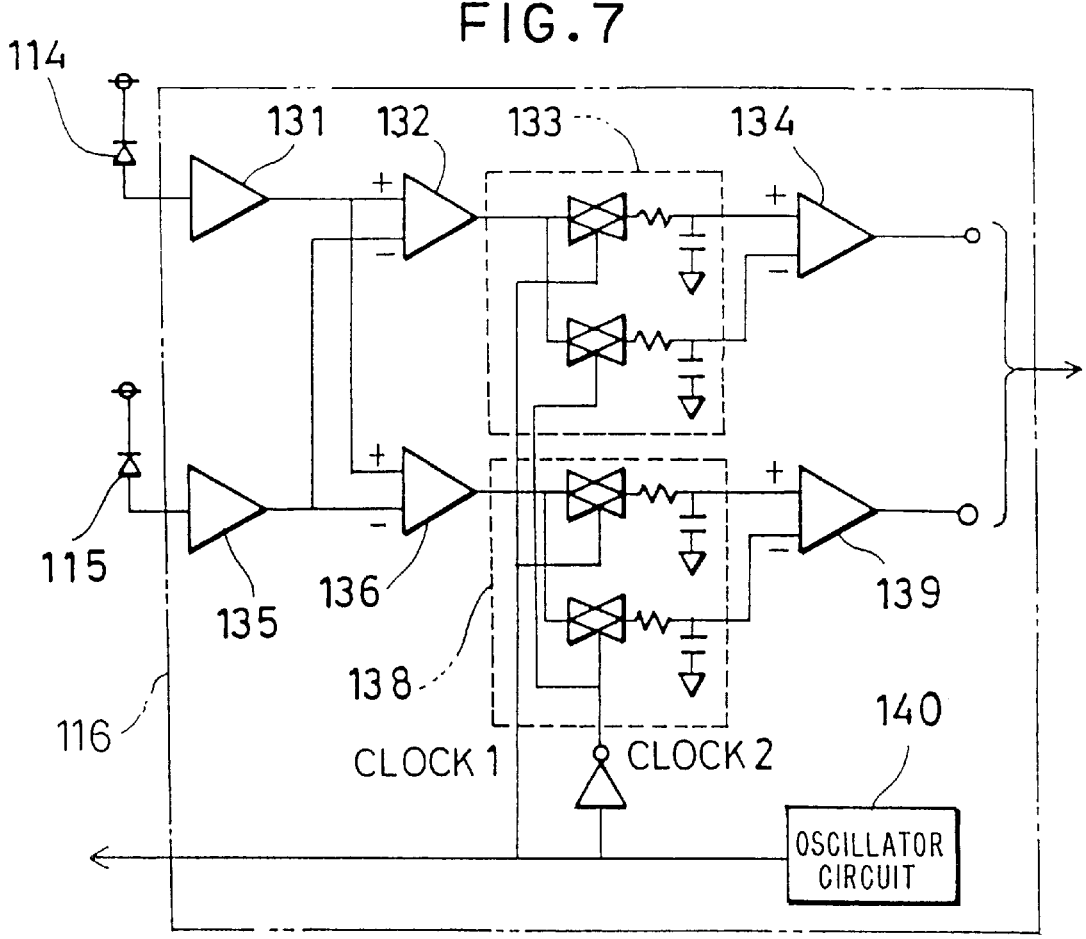
FIG. 7 is a circuit diagram of an example of a reflection light detection circuit of the second embodiment.

Description is now given on an example of the reflection light detection circuit 116 which detects the polarized reflection laser beam referring to FIG. 7.

Outputs of the first photodetector 114 and the second photodetector 115 are inputted to a differential amplifier 132 via amplifiers 131 and 135, and output of the differential amplifier 132 is inputted to a differential amplifier 134 via a synchronous detector 133. Outputs of the first photodetector 114 and the second photodetector 115 are inputted to a summing amplifier 136 via the amplifiers 131 and 135. Output of the summing amplifier 136 is inputted to a differential amplifier 139 via a synchronous detector 138. Outputs of the differential amplifiers 139 and 134 are inputted to a scanning controller 165, a light emitting element driving unit 166, and an alignment display unit 167. The light emitting element driving unit 166 performs pulse modulation of the polarized laser beam emitted from the laser diode 101 based on a clock signal from the reflection light detection circuit 116.

The polarized laser beam emitted from the laser diode 101 driven by the light emitting element driving unit 166 is modulated based on a clock signal from an oscillator circuit 140. The linearly polarized laser beam emitted from the laser diode 101 is turned to parallel beams by the collimator lens 102, and the beams are turned to circularly polarized laser beam after passing through the first λ/4 birefringence member 104. The circularly polarized laser beam passes through the perforated mirror 103, is deflected in horizontal direction by the pentagonal prism 18, and is irradiated.

The pentagonal prism 18 is rotated by the scanning motor 15 via the gear 16 and the scanning gear 17. The pentagonal prism 18 is rotated initially over the total circumferential direction, and the polarized laser beam irradiated from the pentagonal prism 18 scans in total circumferential direction.

By scanning in total circumferential direction, the polarized laser beam passes through the object reflector 168. When passing through it, the polarized laser beam is reflected by the object reflector 168, and the polarized reflection laser beam enters the pentagonal prism 18.

As described above, one-half of the object reflector 168 is simply the reflection layer 122, and the $\lambda/4$ birefringence member 123 is attached on the other half. Therefore, the polarized reflection laser beam reflected by the exposed portion of the reflection layer 122 is circularly polarized light, maintaining direction of polarization of the incident polarized laser beam. The polarized reflection laser beam, which passes through the $\lambda/4$ birefringence member 123 and is reflected by the reflection layer 122, further passes through the $\lambda/4$ birefringence member 123, is turned to circularly polarized laser beam, which is deviated by $\lambda/2$ in phase with respect to the direction of polarization of the incident polarized laser beam. Thus, the directions of polarization are different depending upon the reflection surfaces.

The polarized reflection laser beam reflected by the object reflector 168 is deflected by an angle of 90° by the pentagonal prism 18 and enters the perforated mirror 103, which reflects the reflection laser beam toward the condenser lens 110. The condenser lens 110 directs the reflection laser beam as convergent light toward the second $\lambda/4$ birefringence member 111. Returning as circularly polarized light, the reflection laser beam is converted to linearly polarized light by the second $\lambda/4$ birefringence member 111 and enters the pinhole 112. As described above, the reflection laser beam reflected by the exposed portion of the reflection layer 122 is different from the reflection laser beam reflected by the $\lambda/4$ birefringence member 123 in that the phase is deviated by $\lambda/2$, and the plane of polarization is different and deviated by 90° between the two reflection laser beams converted to linearly polarized light by the second $\lambda/4$ birefringence member 111.

The pinhole 112 fulfills such function that it does not allow the reflection laser beam, not accurately facing to and having optical axis deviated from that of the polarized laser beam emitted from the main unit 4, to enter the first photodetector 114 and the second photodetector 115, and the reflection laser beam enters the polarized beam splitter 113 after passing through the pinhole 112.

The polarized light beam splitter 133 allows the laser beam to pass, which has the same direction of polarization as that of the polarized laser beam emitted from the emitter 162, and it reflects the laser beam having a different direction of polarization deviated by 90° from that of the polarized laser beam emitted from the emitter 162. Thus, upon passing through the polarized light beam splitter 113, the reflection laser beam is split into polarized light components running perpendicularly to each other by the polarized light beam splitter 113, and the first photodetector 114 and the second photodetector 115 receive the split reflection laser beams respectively.

In the light receiving status of the first photodetector 114 and the second photodetector 115, when the polarized reflection laser beam after passing through the $\lambda/4$ birefringence member twice outside the main unit 4, i.e. the polarized reflection laser beam reflected by the $\lambda/4$ birefringence member 123 of the object reflector 168, enters the reflection light detector 164, and the light quantity entering the first photodetector 114 is higher than the light quantity entering the second photodetector 115 because of the relationship between the second $\lambda/4$ birefringence member 111 and the polarized light beam splitter 113. Also, when the polarized reflection laser beam not passing through the $\lambda/4$ birefringence member, i.e. the polarized reflection laser beam reflected by the exposed portion of the reflection layer 122 of the object reflector 168, the light quantity entering the second photodetector 115 is higher than the light quantity entering the first photodetector 114.

By finding out the difference between the incident light quantity of the polarized reflection laser beam to the first photodetector 114 and the incident light quantity to the second photodetector 115, it is possible to determine whether the incident polarized reflection laser beam has been reflected by the exposed portion of the reflection layer 122 of the object reflector 168 or it has been reflected by the $\lambda/4$ birefringence member 123. That is, it is possible to detect the boundary between the exposed portion of the reflection layer 122 and the $\lambda/4$ birefringence member 123, i.e. the center of the object reflector 168.

More detailed description will be given below.

Figure 9:
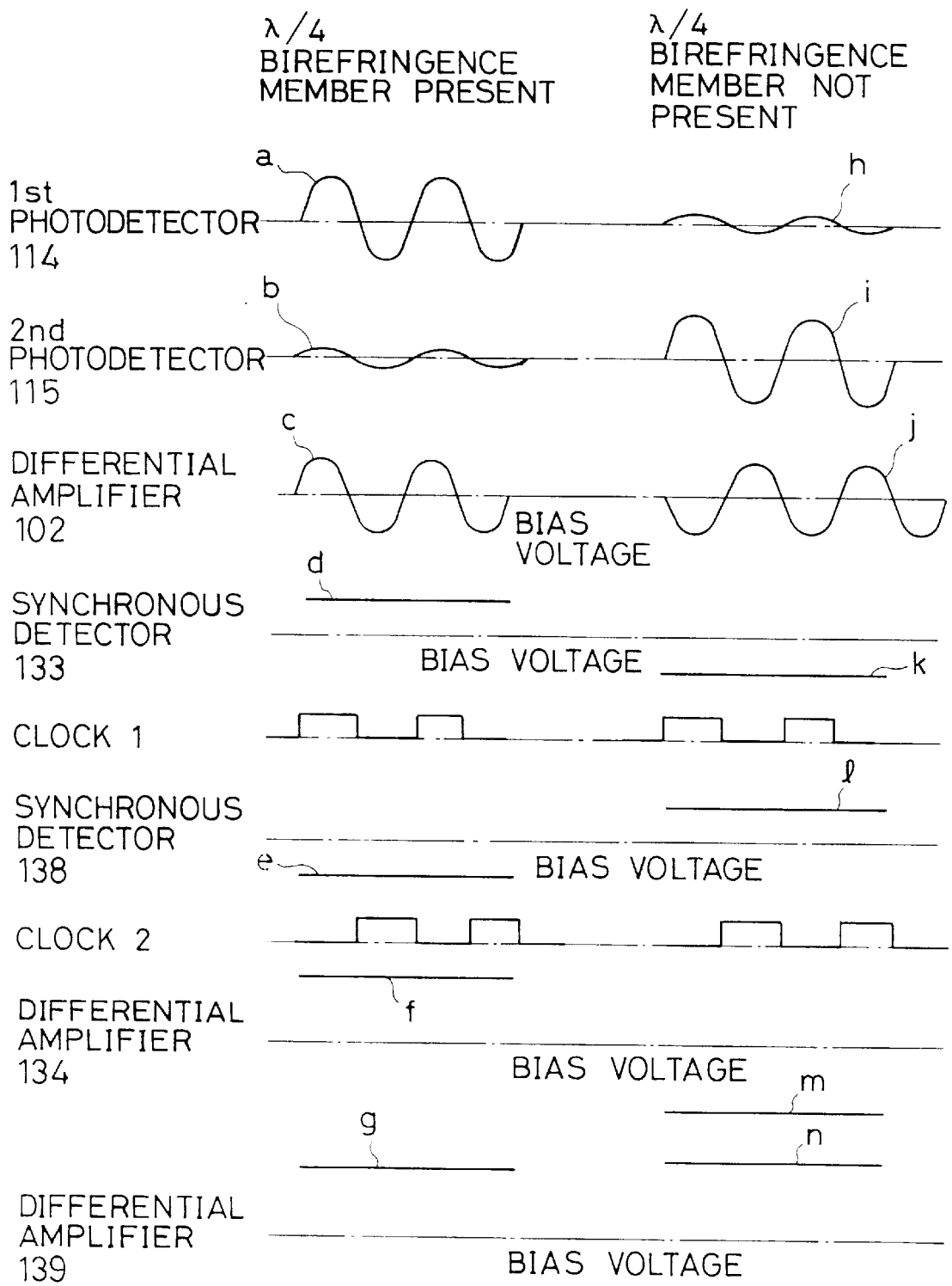
FIG. 9 represents diagrams for explaining operation of the reflection light detection circuit.

In case of the reflection laser beam after passing through the $\lambda/4$ birefringence member 123 twice, the light quantity entering the first photodetector 114 of the reflection light detector 164 is higher than the light quantity entering the second photodetector 115. The signals are shown in a and b of FIG. 9. The signals from the first photodetector 114 and the second photodetector 115 are amplified by the amplifiers 131 and 135, and the difference is taken by the differential amplifier 132. This signal is given by c in FIG. 9. When the output signal of the differential amplifier 132 is synchronously detected by a clock 1 from the oscillator circuit 140, positive voltage (given by d in FIG. 9) to bias voltage is obtained. When synchronous detection is performed by a clock 2, negative voltage (given by e in FIG. 9) to bias voltage is obtained. Taking the difference between the voltages obtained by synchronous detection (d−e) the output of the differential amplifier 134 is obtained as positive voltage (given by f in FIG. 9) to bias voltage.

In case of the reflection laser beam not passing through the $\lambda/4$ birefringence member 123, light quantity entering the second photodetector 115 of the reflection light detector 164 is higher than the light quantity entering the first photodetector 114. The signals are shown by h and i in FIG. 9. The signals from the first photodetector 114 and the second photodetector 115 are amplified by the amplifiers 131 and 135, and the difference is taken by the differential amplifier 132. This signal is given by j in FIG. 9. When the output signal of the differential amplifier 132 is synchronously detected by the clock 1 from the oscillator circuit 140, negative voltage (given by k in FIG. 9) to bias voltage is obtained. When synchronous detection is performed by the clock 2, positive voltage (given by l in FIG. 9) to bias voltage is obtained. Taking the difference between the voltages obtained by synchronous detection (k−l), the output of the differential amplifier 134 is obtained as negative voltage (given by m in FIG. 9) to bias voltage.

Figures 10A, 10B:
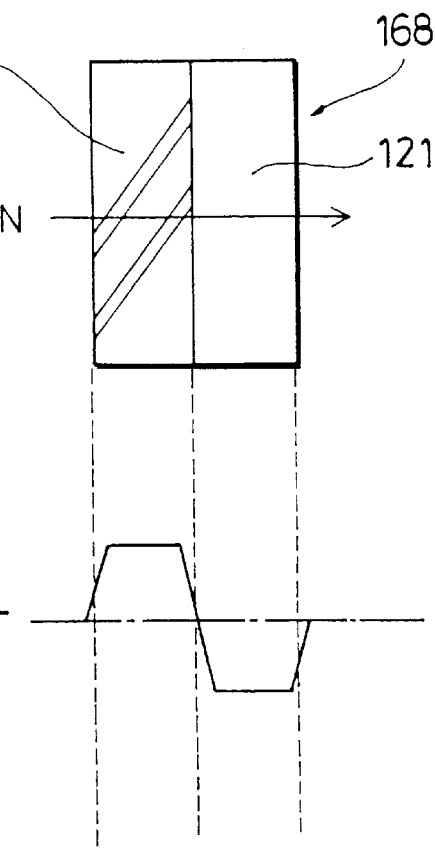
FIG. 10A and FIG. 10B each represents relationship of outputs from the object reflector, the laser beam and the reflection light detection circuit.

In case the object reflector 168 shown in FIG. 8 or FIG. 10A is scanned by the polarized laser beam, the output of the differential amplifier 134 of the reflection light detection circuit 116 has a waveform shown in FIG. 10B. In case a positive signal is found in the output of the differential amplifier 134 and the falling of the negative signal is found within a given time from the falling of the positive signal, the position discriminator 117 identifies that it is the object reflector 168 and further determines that the position of boundary (where signal value is 0) is the center of the object reflector 168. In case the object reflector 168 is used, if rotating direction of the polarized laser beam is reverse, it is needless to say that the sign (+ or −) of the output signal of the differential amplifier 134 of the reflection light detection circuit 116 is reversed.

The correction of the direction of the main unit 4 after the center of the object reflector 168 has been identified is similar to what has been described for the above embodiment, and detailed description is not given here.

Figure 11:
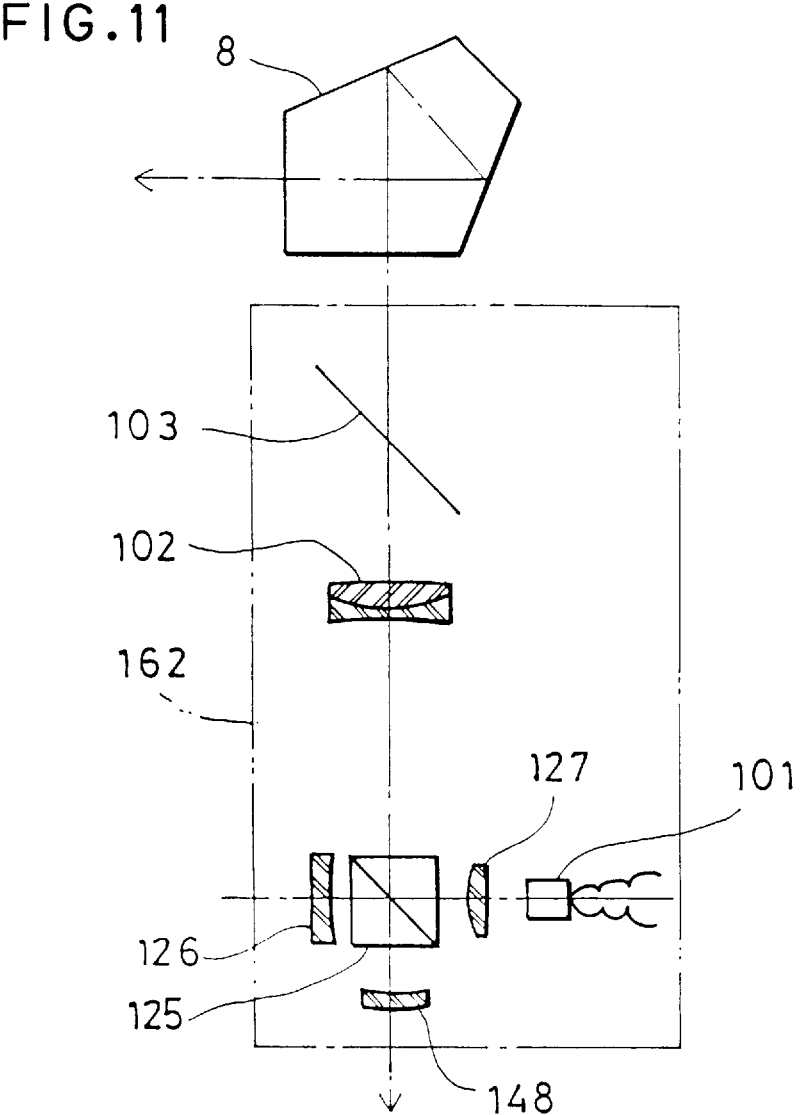
FIG. 11 is a block diagram of an emitter of a third embodiment of the present invention.

Description is now given on a third embodiment referring to FIG. 11. In the third embodiment, the emitter 162 is changed in such manner that the laser beam emitted from the laser diode 101 is also emitted in downward direction.

The optical axis of the laser diode 101 is directed perpendicularly to the rotating center of the laser projector 10, and a half prism 125 is arranged at the intersection. Further, a reflection mirror 126 is disposed at a position on the side of the half prism 125 opposite to the laser diode 101, and a condenser lens 127 is arranged between the half prism 125 and the laser diode 101. The laser beam emitted from the laser diode 101 and reflected by the half prism 125 is directed toward the pentagonal prism 18, and the laser beam, passing through the half prism 125, reflected by the reflection mirror 126 and reflected by the half prism 125, is directed in downward direction. Because the laser beam is sent in downward direction, it is possible to easily identify whether the main unit 4 is correctly installed at the reference position and this facilitates the operation to set the main unit 4 at the reference position.

Figure 13:
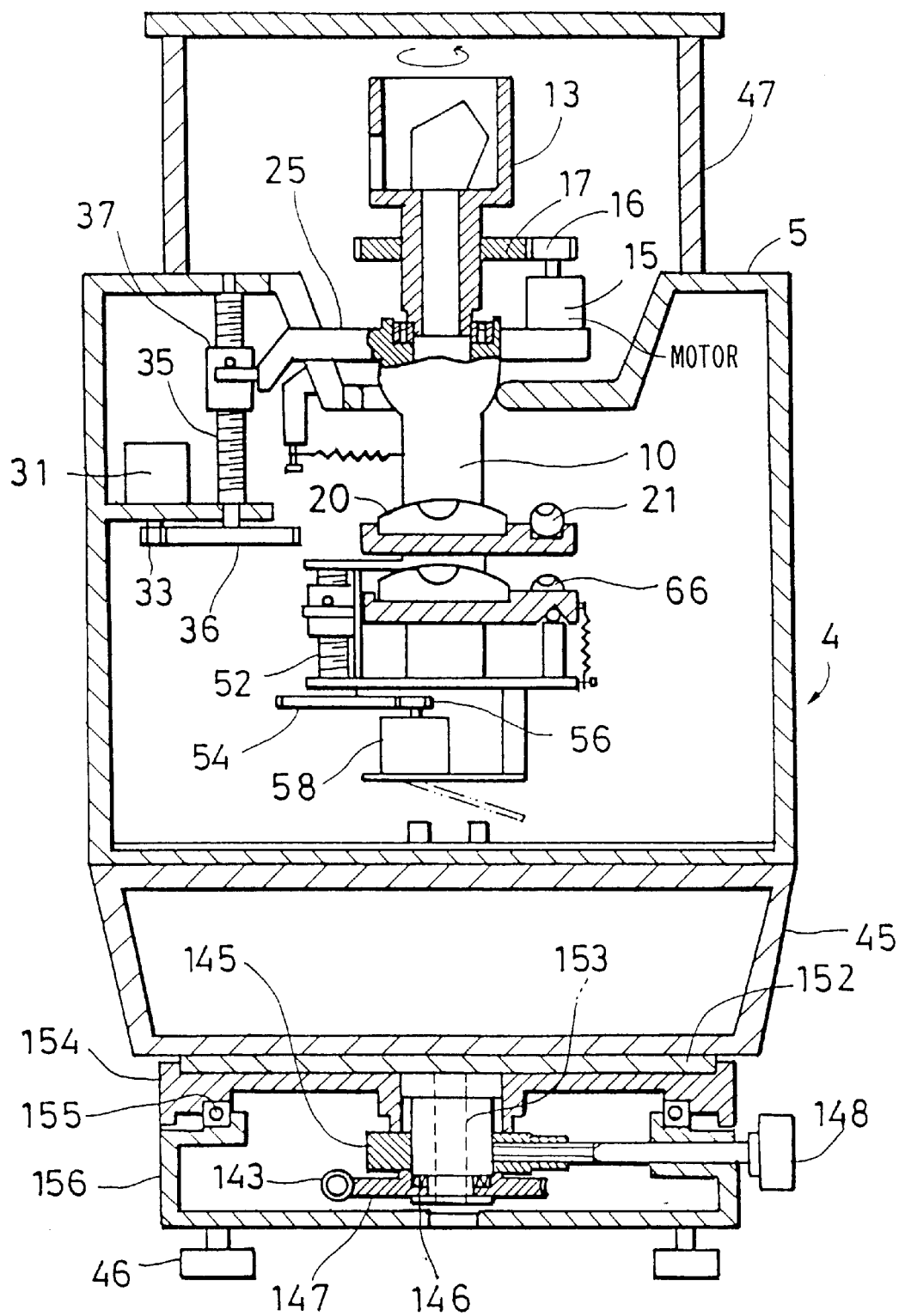
FIG. 13 is a cross-sectional view of a laser survey instrument equipped with a manual adjusting mechanism capable to manually adjust the direction of a main unit.

FIG. 13 shows an embodiment where the main unit rotator 151 is eliminated and the surveyor corrects the direction of the main unit 4 manually according to the display on the display unit 118. The same component as in FIG. 1 is referred by the same symbol, and detailed description is not given here.

Figure 14:
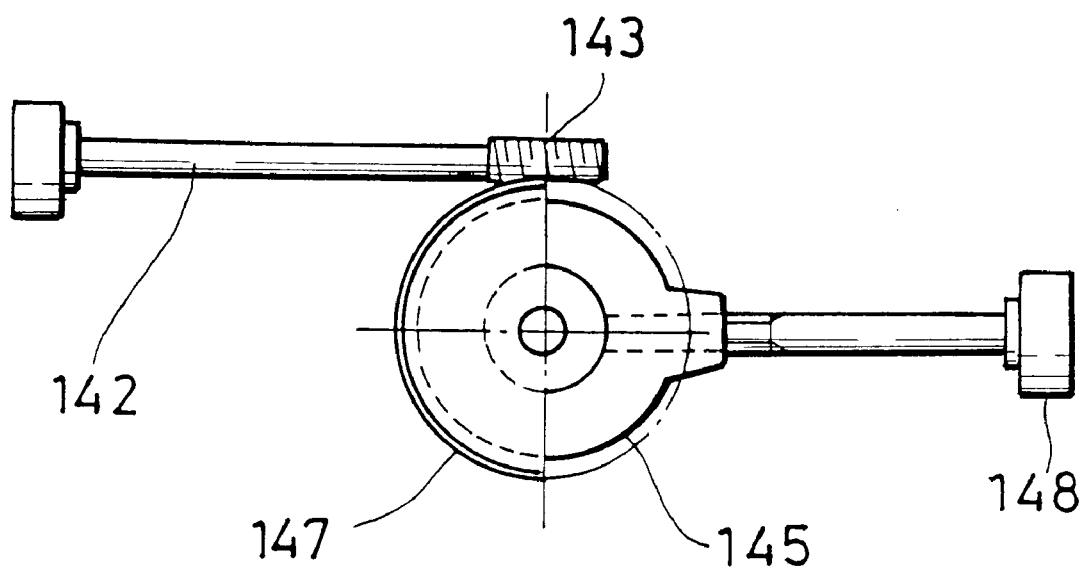
FIG. 14 is a plan view of an essential portion of the above manual adjusting mechanism.

As shown in FIG. 14, the rotation base 152 is fixed on the lower surface of the battery box 45, and the rotating shaft 153 is protruded at a position lower than the rotation base 152. The rotation frame 154 is fixed on the rotation base 152, and the rotation frame 154 is rotatably mounted on a hollow fixed frame 156 via a bearing 155. The rotating shaft 153 passes through the rotation frame 154. A fixed collar 145 is engaged with the rotating shaft 153, and a worm wheel 147 is engaged with the lower end of the rotating shaft 153 with a wave washer 146 therebetween. A fine adjustment rod 142 rotatably passing through the fixed frame 156 is provided, and a worm gear 143 engaged with the worm wheel 147 is formed at the forward end of the fine adjustment rod 142. In the fixed collar 145, a fixing screw 148 rotatably passing through the fixed frame 156 is screwed, and the forward end of the fixing screw 148 can be brought into contact with the rotating shaft 153.

Next, description will be given on adjustment of the direction of the main unit 4.

For rough adjustment, the fixing screw 148 is loosened, and the main unit 4 is manually rotated in a given direction. Between the worm wheel 147 and the rotating shaft 153, friction force caused by the wave washer 146 is applied, and when rotating force applied on the main unit 4 is increased larger than the friction force, it can be rotated manually. For fine adjustment, the fine adjustment rod 142 is rotated, and the main unit 4 can be rotated with fine adjustment via the worm gear 143 and the worm wheel 147.

It is possible to accurately direct the main unit 4 toward a given direction. When the direction of the main unit 4 is determined, the fixing screw 148 is tightened to lock the main unit 4.

Figure 12:
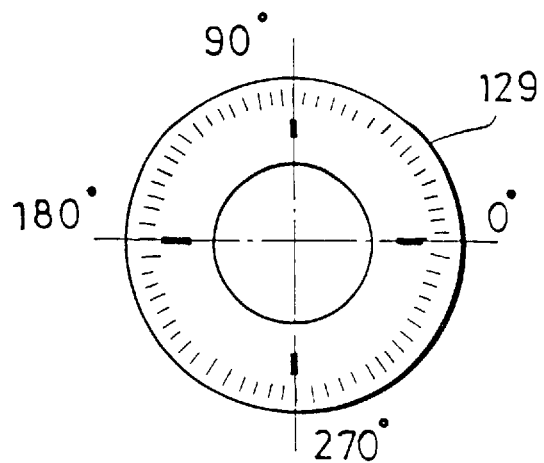
FIG. 12 is a front view of an angle display disk used in the present invention.

In another embodiment, the index of the encoder may be placed at a plurality of positions such as 0°, 90°, 180°, 270°, etc., and the position of the object reflector can be easily confirmed by comparing the position of the object reflector with each of these positions. By providing the indices at a plurality of positions, the main unit 4 can be identified promptly. Or, an angle display disk 129 having reference position detecting marks at 0°, 90°, 180° and 270° as shown in FIG. 12 maybe provided on the display unit 118 so that the direction of the main unit 4 is displayed by light point on the angle display disk 129 and the surveyor can visually find the direction of the main unit 4. The half prism 125 maybe an optical element such as half mirror, beam splitter, etc. to split the laser beam. Further, the laser survey instrument has a mechanism tiltable in two directions with respect to the horizontal plane in the above embodiment, while it is needless to say that the present invention can be applied to a laser survey instrument, which has a mechanism tiltable in one direction only.

In the embodiment shown in FIG. 1, the direction of the main unit 4 is corrected by feedback control to detect rotating angle of the main unit 4 with respect to the fixed frame 156 by the encoder 150, and a servomotor or the like is used as the rotating motor 160, while the encoder 150 may be eliminated. In this case, a pulse motor is suitable as the motor. Its operation is described below.

By the rotating motor 160, the main unit 4 is rotated in a direction to be corrected via the rotating gear 157. While rotating the main unit 4, the rotating unit 163 is rotated. The rotating unit 163 is rotated, and the laser beam is irradiated on the object reflector 168. Then, a deviation when the reflection light from the object reflector 168 is detected is calculated. When the deviation is turned to 0 by repeating the above procedure, it is determined that the direction of the main unit 4 is aligned with the predetermined direction and that the main unit has been rotated by an angle of ω toward the direction to be corrected.

In the above embodiment, the object reflector (target) 168 is placed in a direction to be tilted and at a tilting position, and the direction of the instrument itself is corrected by turning the main unit 4 approximately in that direction. By changing the object reflector 168, it is possible to correct the tilt angle itself and to perform correct setting.

Figure 15:
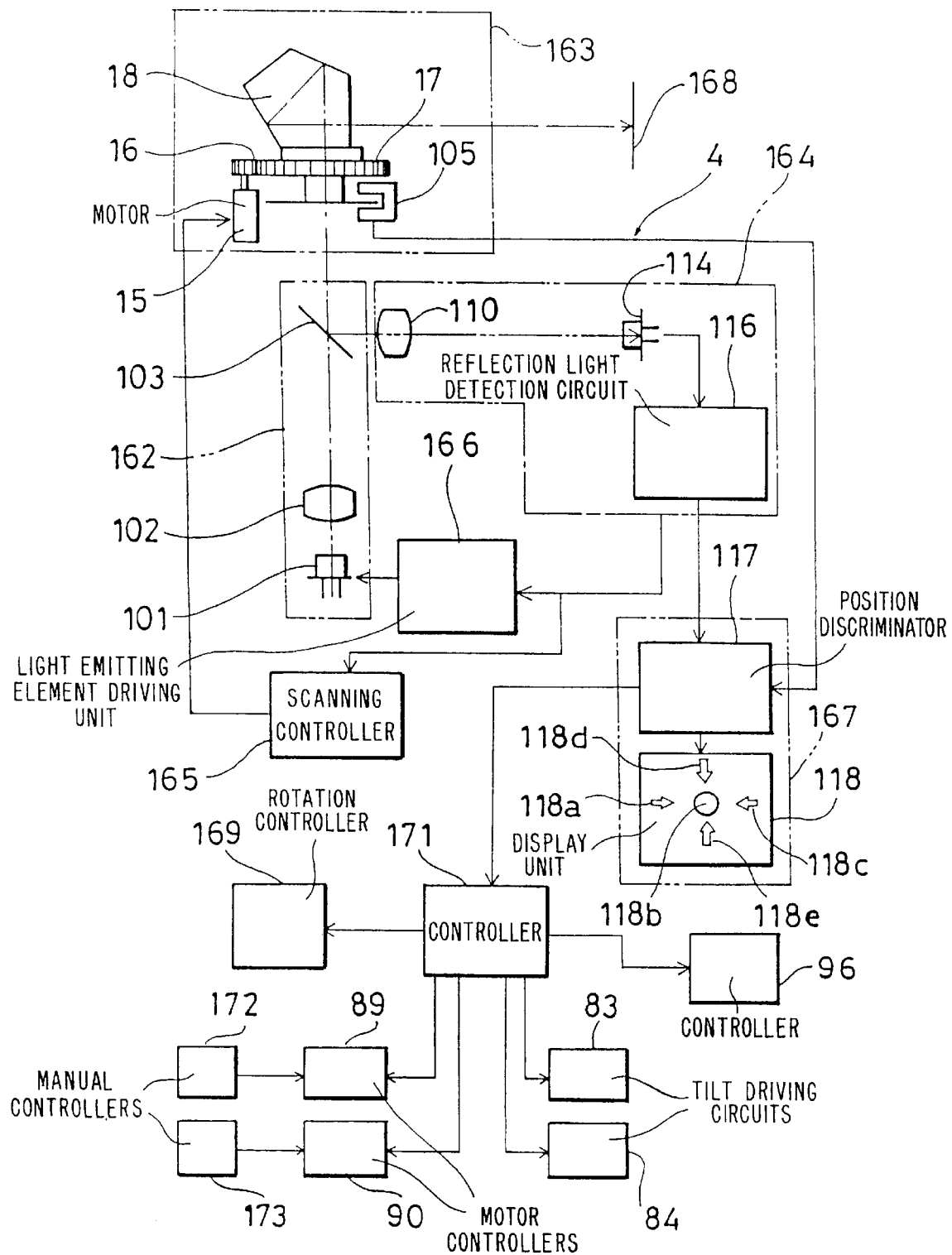
FIG. 15 is a block diagram of a laser survey instrument equipped with a mechanism capable to manually adjust tilt angle of the laser beam to be irradiated.

In the following, description will be given on a fourth embodiment, in which tilting direction and tilt angle can be corrected, referring to FIG. 15. FIG. 15 is a block diagram of a control system of the embodiment corresponding to FIG. 2 as described above. The mechanical portion and the optical system of the instrument are the same as the above embodiment, and detailed description is not given. Reference is made now to FIG. 1.

In the following, description will be given only on the features, which are different from those in the embodiment of FIG. 2.

The output of the position discriminator 117 is inputted to a controller 171, which generally controls motor controllers 89 and 90 for controlling level adjusting motors 31 and 32, tilt driving circuits 83 and 84 for controlling tilting motors 58 and 59, a controller 96 for indicating tilt angle, and a rotation controller 169 for controlling rotation of the rotating unit 163 to rotate the main unit 4.

To the motor controllers 89 and 90, manual controllers 172 and 173 are connected. By manually operating the manual controllers 172 and 173, the level adjusting motors 31 and 32 can be directly controlled. The manual controllers 172 and 173 are equipped with push-button switch or jog shuttle to control rotating direction and speed of the motor.

Description is given on operation of this embodiment, referring to FIGS. 16A, 16B, 16C and 18.

Figure 16A:
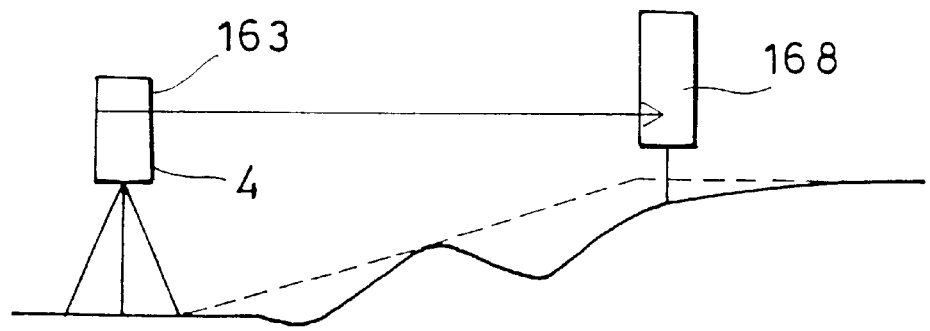
FIGS. 16A, 16B and 16C are drawings for explaining operation in case tilting of the laser beam to be irradiated is determined by utilizing the object reflector.

The instrument is installed at a given position where tilting should be set using a tripod. The main unit 4 is directed approximately in the direction to be tilted. In this case, a foresight and a backsight belonging to the main unit 4 maybe used. The object reflector 168 is installed at a position where tilting should be made (FIG. 16A).

Figure 20A:
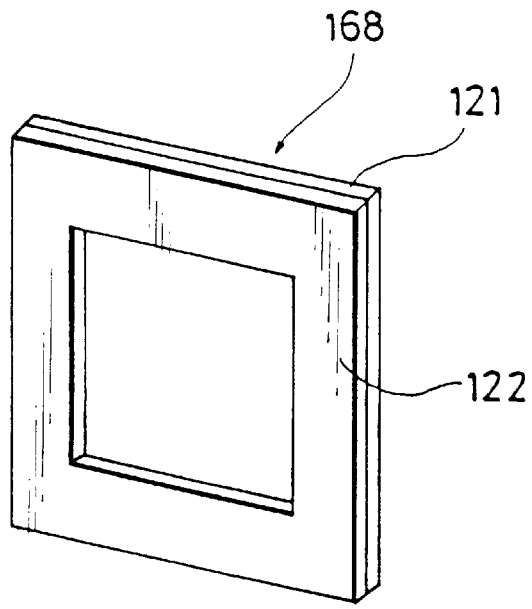
FIG. 20A and FIG. 20B each represents an example of the object reflector.
Figure 20B:
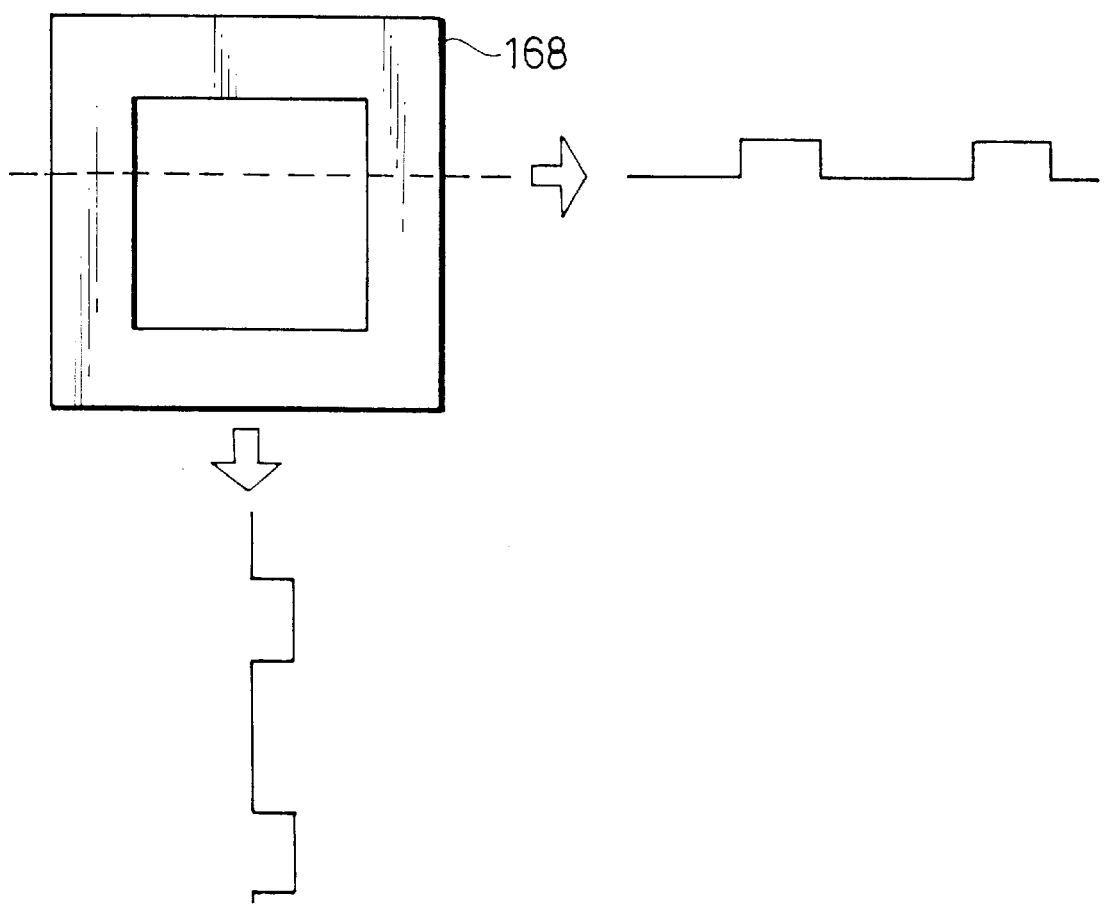

Here, the object reflector 168 used in the present embodiment is described in connection with FIG. 20A. In this object reflector, reflection layers 122 are placed at symmetrical positions, i.e. above, below, left and right with respect to the center of the substrate 121. In FIG. 20A, the reflection layers 122 are formed on peripheral areas of the substrate 121 with a rectangular shape. When the laser beam is irradiated in vertical direction to scan the object reflector 168, two pulse-like reflection laser beams are received as shown in FIG. 20B as in the case of scanning in horizontal direction. By calculating the position of the center of gravity of the light beam received, the center position in vertical direction can be identified.

Figure 16B:
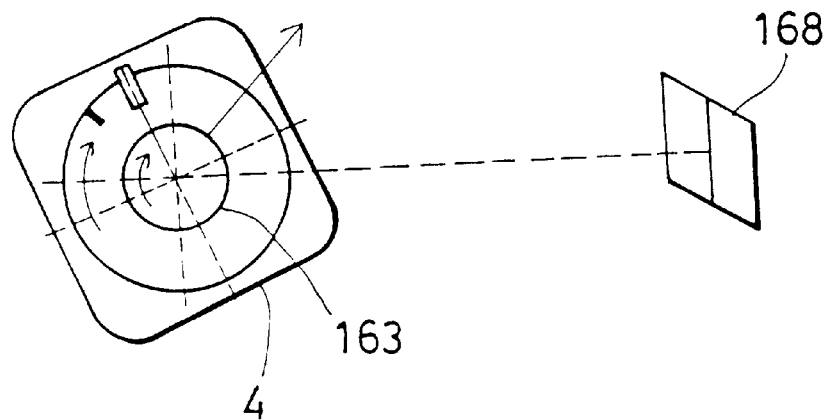

Then, the instrument is operated. After the instrument is installed on the horizontal reference plane, rotating irradiation of the laser beam is started, and scanning is performed in the tilting direction (FIG. 16B). Scanning in the tilting direction and operation of the mechanism have already been described in the above embodiment, and detailed description is not given here.

When the reflection laser beam from the object reflector 168 is detected, the main unit 4 is rotated, and the tilting direction is set. After the tilting direction has been set, rotation is stopped while irradiating the laser beam to the object reflector 168. The level adjusting motors 31 and 32 are operated, and the laser projector 10 is tilted. In this case, it will suffice if the laser beam is approximately at the center of the target.

Figure 16C:
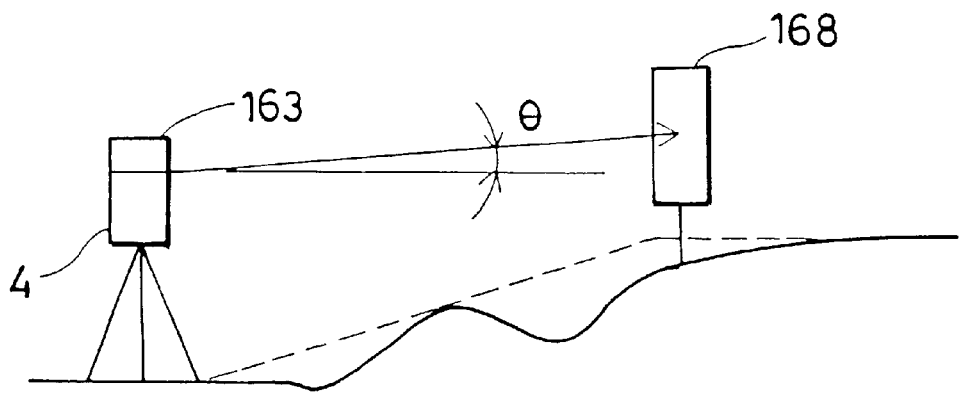

Scanning is performed in horizontal tilting direction and the center of gravity is obtained. At the same time, scanning is performed to obtain the center of gravity in vertical direction. Reciprocal scanning is performed to detect the upper and the lower reflection layers, and the center of gravity is obtained. If the laser beam is deviated from the center of the target, the direction to be tilted is shown by the arrows 118*d* and 118*e* in the display unit 118. When the tilting in a given tilting direction is set, the controller 171 operates the tilting motors 58 and 59. The tilting motors 58 and 59 are operated, and the tilting plate 62 is tilted until the arbitrary angle setting bubble tube 65 is turned to horizontal direction. By converting the number of pulses of the tilting motors 58 and 59 from the preset tilting until the arbitrary angle setting bubble tube 65 is turned to horizontal direction, the setting tilt angle is obtained (FIG. 16C). The angle is displayed on the display unit (not shown) on the controller 171. In case the preset tilting is to be changed, switch or jog shuttle of the manual controllers 172 and 173 are used while watching the display unit 118 or the display unit of the controller 171. The tilting motors 58 and 59 are operated by the number of pulses corresponding to the tilting to be changed, and the arbitrary angle setting bubble tubes 65 and 66 are tilted. When the level adjusting motors 31 and 32 are operated so that the arbitrary angle setting bubble tubes 65 and 66 are turned in horizontal direction, tilting is changed. The number of pulses of the tilting motors 58 and 59 are converted to correction angle, and tilt angle is displayed. The level adjusting motors 31 and 32 may be directly operated to change the tilting, and the tilting may be converted from the number of pulses and displayed.

Figure 17A:
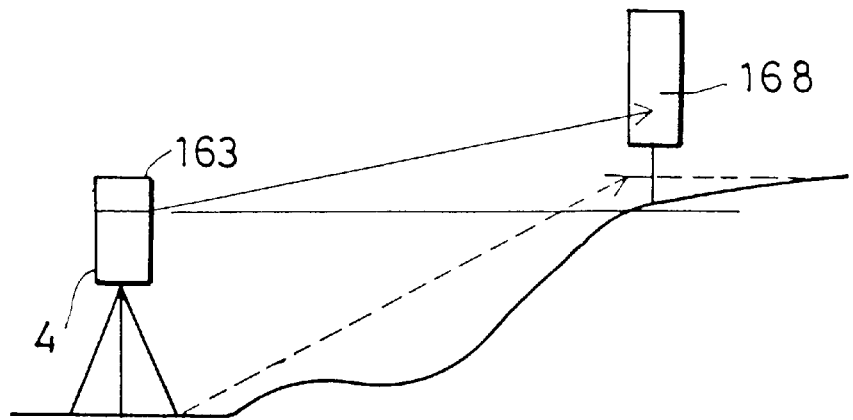
FIGS. 17A, 17B and 17C are drawings for explaining operation in case tilting of the laser beam to be irradiated is determined by utilizing the object reflector.
Figure 17B:
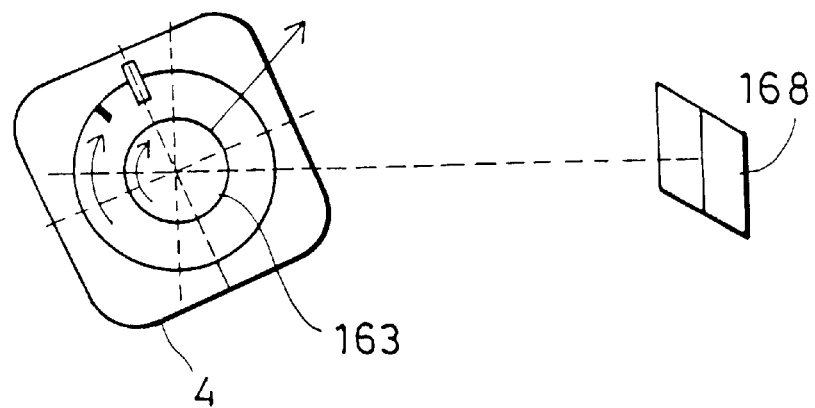
Figure 17C:
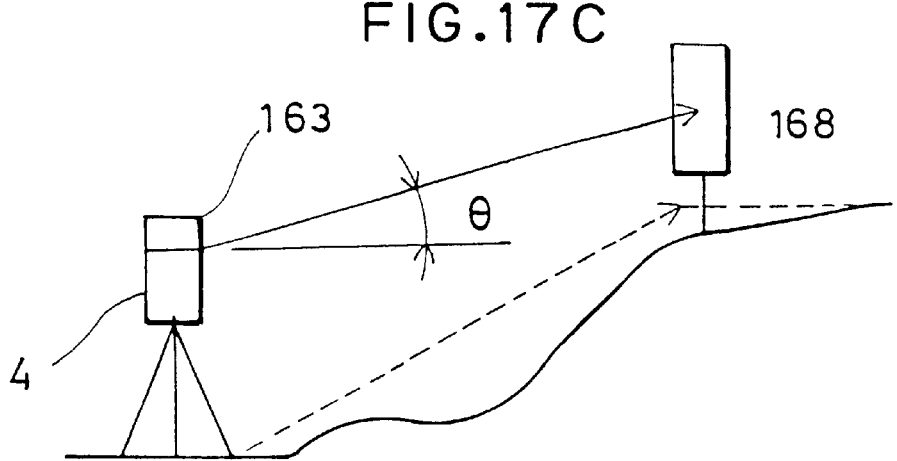
Figure 18:
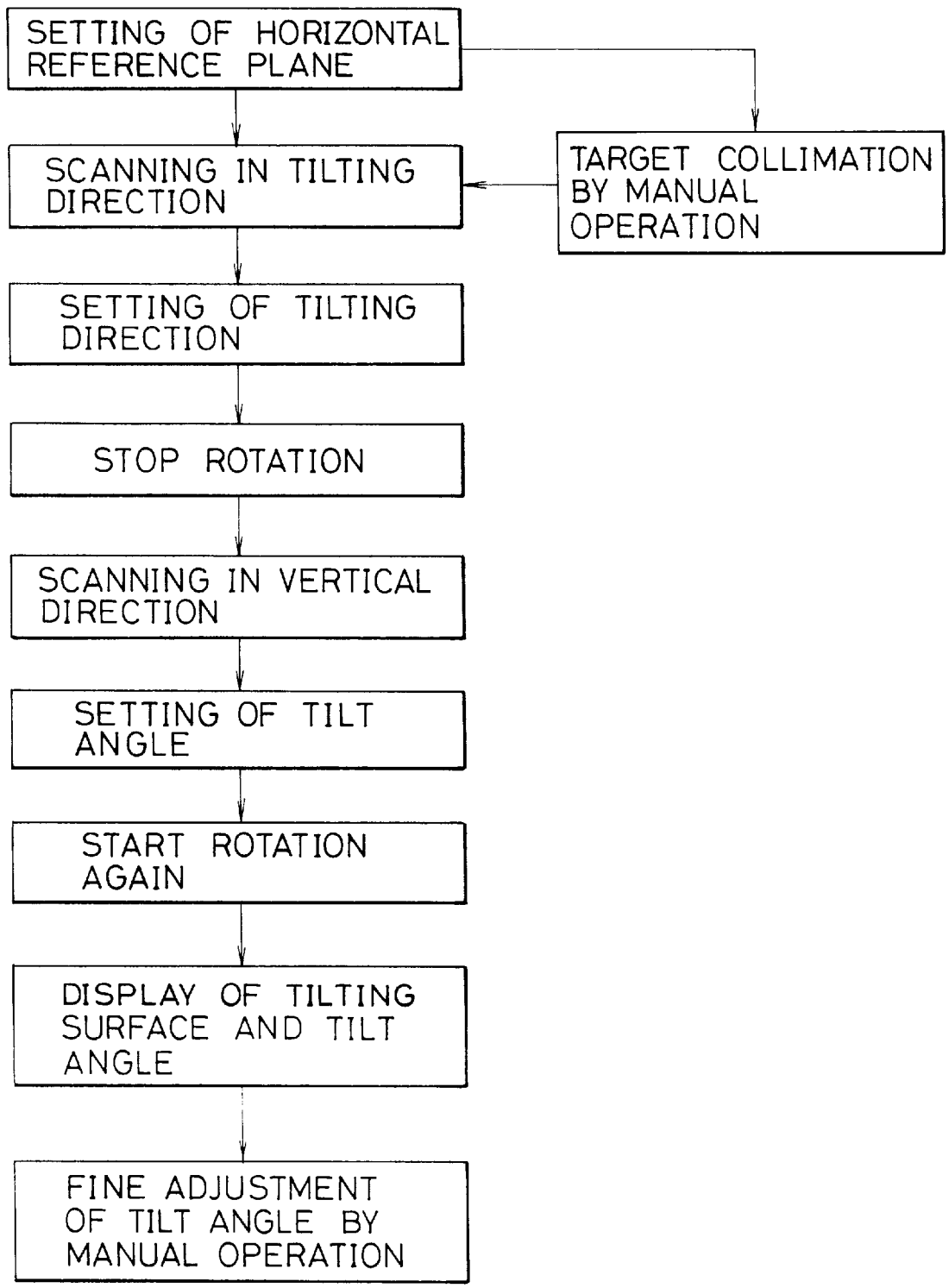
FIG. 18 is a flow chart showing operation in case tilting of the laser beam to be irradiated is determined by utilizing the object reflector.

In case tilt angle is large as shown in FIGS. 17A, 17B and 17C and the laser irradiating position is apparently deviated from the object reflector 168 after setting has been made to the horizontal reference plane, the setting is made for once to the horizontal reference plane. Then, it is switched over to manual control, and the tilting direction and the laser irradiating direction are tilted approximately toward the direction of the object reflector 168 using the foresight and the backsight belonging to the main unit. The object reflector in the turned direction can be confirmed by the reflection of the laser beam. After installed, it is again switched over to automatic scanning while being tilted, and similar setting operation is performed after switching.

Figure 21A:
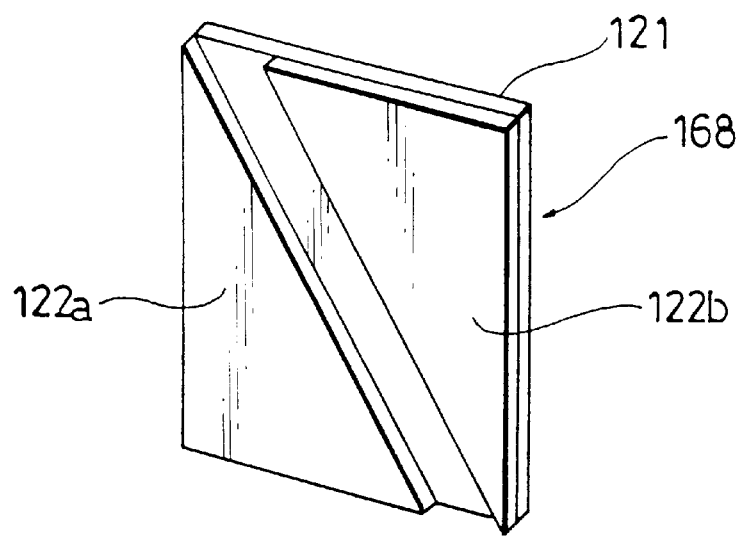
FIG. 21A and FIG. 21B each represents an example of another object reflector.

Next, description will be given on operation in case the object reflector 168 as shown in FIG. 21A is used.

On the object reflector 168, the portion without the reflection layers 122 is arranged diagonally in belt-like form, and the reflection layer 122 is divided into two portions: a reflection layer 122*a* in form of a right-angled triangle, and a reflection layer 122*b* in form of an inverted right-angled triangle, and these are arranged in such manner that the widths of the divided reflection layers 122*a* and 122*b* in scanning direction are in inverse proportion to each other as the scanning position is moved.

Figure 21B:
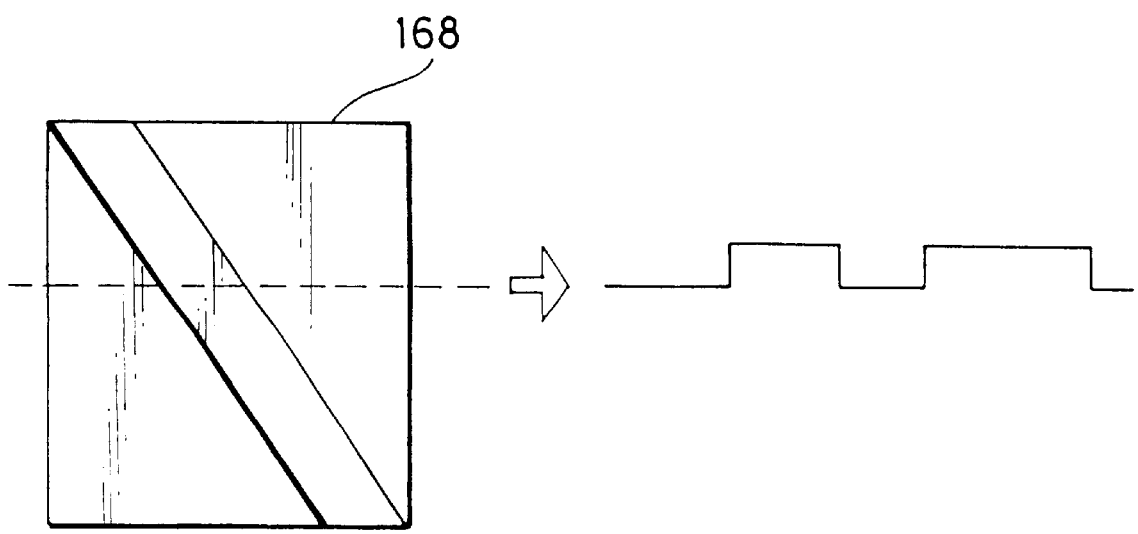

The signal obtained when the object reflector 168 is used is as shown in FIG. 21B, and what is to be obtained is found where the widths of the signals of the reflection laser beam from the divided reflection layers 122*a* and 122*b* concur, i.e. where the angles obtained by the encoder 105 concur on the two reflection layers. Thus, the position of tilt angle can be determined only by scanning in horizontal direction and without scanning in vertical direction. There is no need to stop scanning of the laser beam, and working efficiency is high.

Figure 22A:
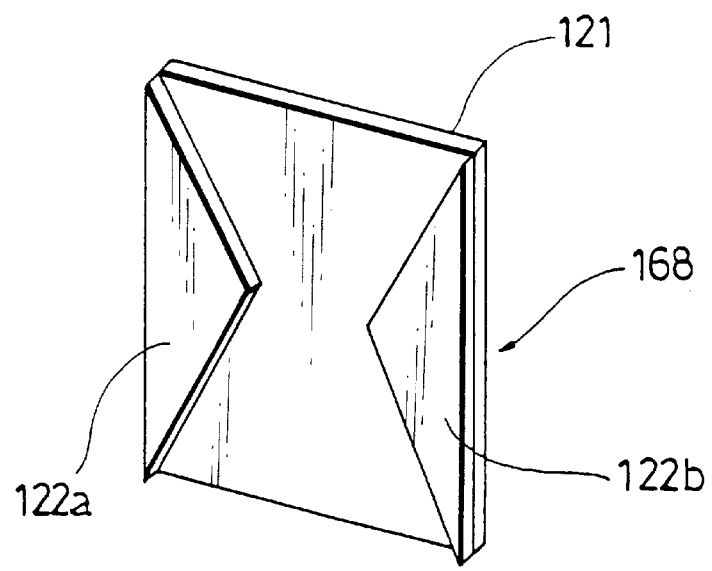
FIG. 22A and FIG. 22B each represents an example of a still another object reflector.
Figure 22B:
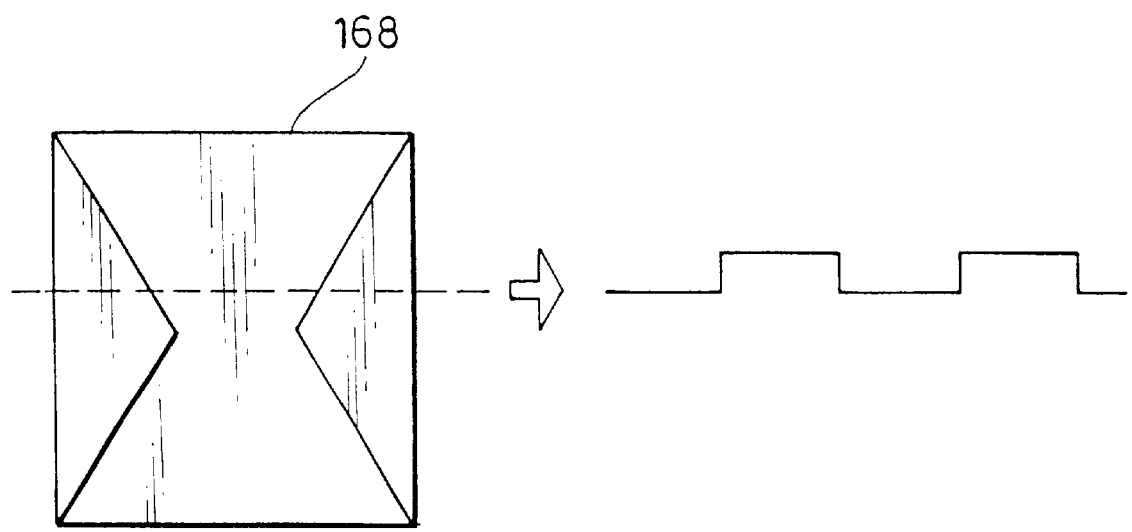

FIG. 22A also shows the case where the reflection layer 122 of the object reflector 168 is divided into two portions. In this case, each of the reflection layers 122*a* and 122*b* are designed in a crest-like triangle with vertexes facing to each other and arranged symmetrically with respect to the vertical center line. On this object reflector 168, the laser beam is irradiated as in the case of the object reflector 168 of FIG. 21A by rotary scanning in horizontal direction. By moving the scanning position continuously in vertical direction, the center position in vertical direction can be detected. In case the object reflector 168 shown in FIG. 22A is used, the obtained signal is as shown in FIG. 22B, and the center is in a direction where the signals of the two reflection laser beams increase, and the center is located at the maximum value of the signal. The tilting is determined by the detection of the center position, and the tilting motors 58 and 59 are operated. The value of the signal is not limited to the maximum value, and the reflection layers may be arranged to cause the minimum value.

Figure 23:
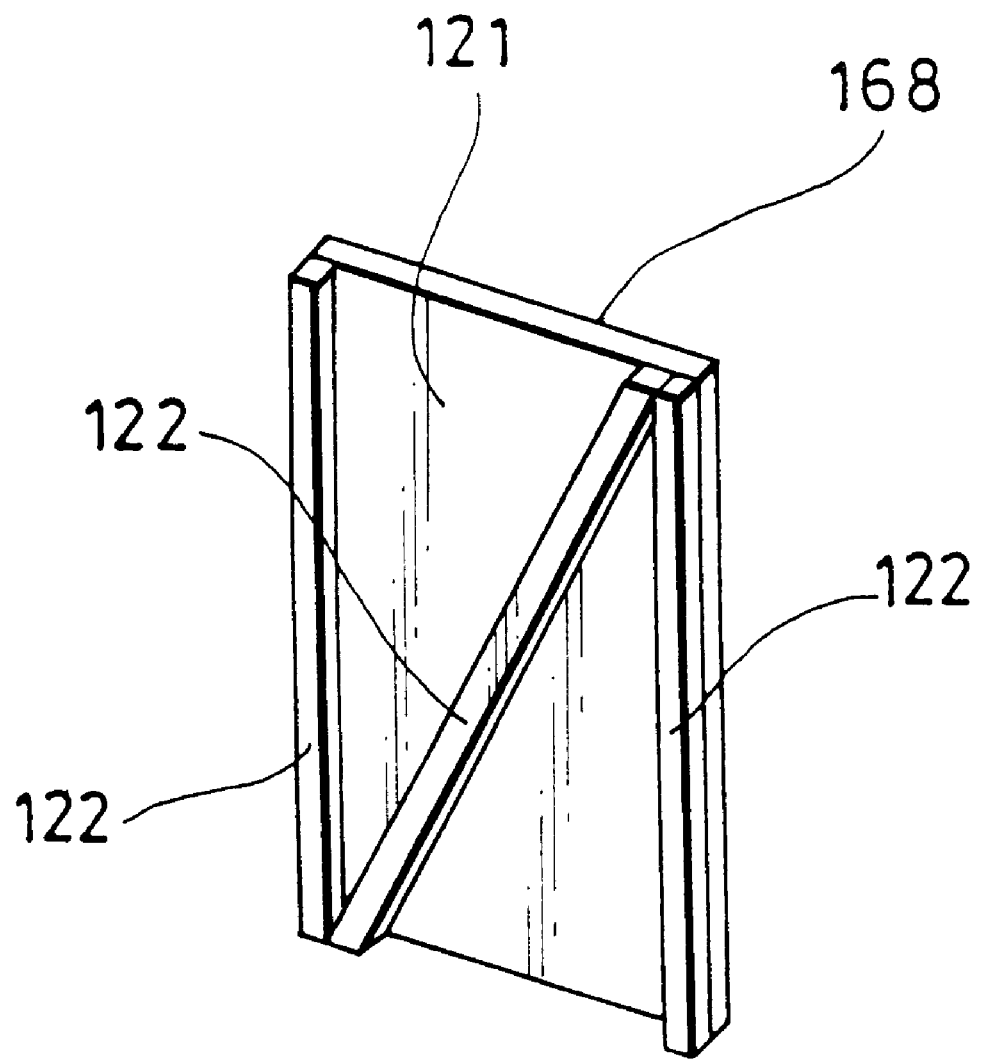
FIG. 23 represents an example of a yet still another object reflector.

In FIG. 23, the reflection layers 122 of the object reflector 168 are arranged in form of narrow belt, two along lateral end and one along the diagonal line to provide an N-shaped reflection layers 122 as a whole. In case this object reflector 168 is used, the signal of the laser beam reflected by scanning of the object reflector 168 by the laser beam is turned to three-pulse signals, and the second signal position is changed according to the scanning position. When the second pulse signal position is at the center of the pulse signals at both ends, it is the center of the object reflector 168. Thus, by detecting three-pulse positions, the center of the object reflector 168 can be detected. The operation after the center of the object reflector 168 has been detected is the same as described above, and detailed description is not given here.

Figure 26:
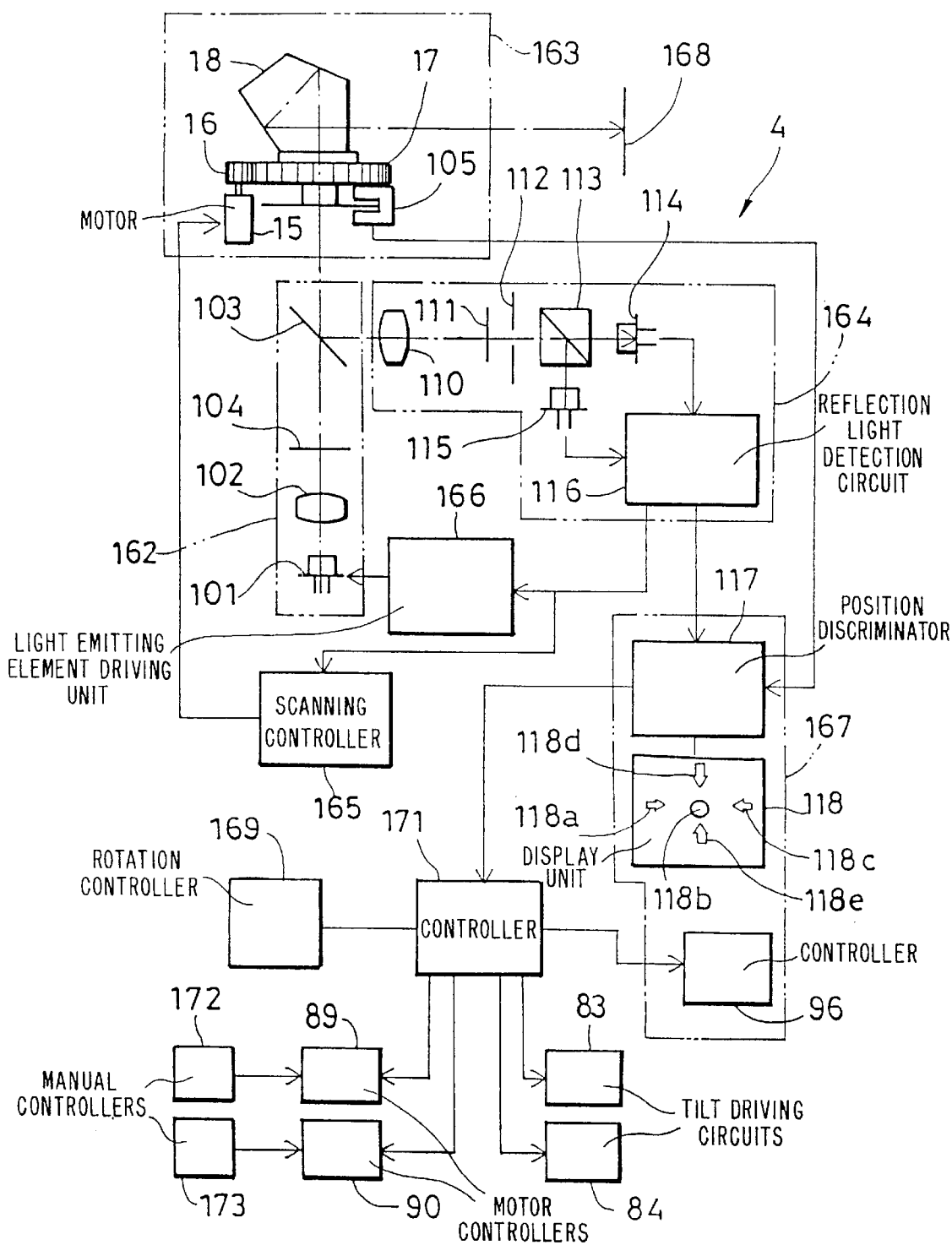
FIG. 26 is a block diagram of an optical system and a control system of a fifth embodiment of the present invention.
Figure 27A:
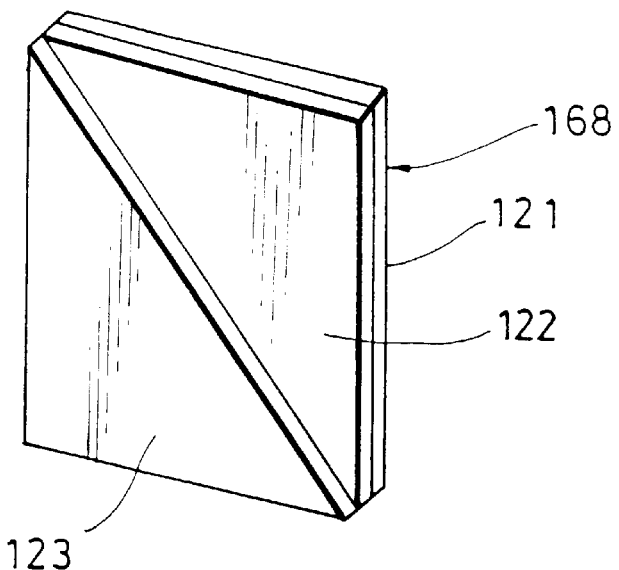
FIG. 27A and FIG. 27B each represents an object reflector used in the fifth embodiment.

FIG. 26 is a diagram of an embodiment corresponding to FIG. 6, and the object reflector 168 shown in FIG. 27A is used. On a rectangular substrate 121, a reflection layer 122 is arranged. On one of the two portions divided by the diagonal line, a λ/4 birefringence member 123 is attached, and the other half is the exposed portion of the reflection layer 122. The exposed portion serves as a polarized light maintaining reflecting unit for reflecting the light while maintaining direction of polarization of the incident light beam, and the λ/4 birefringence member 123 serves as a polarized light converted reflecting unit, which reflects the light while converting direction of polarization from that of the incident light beam. It is arranged in such manner that the width of the scanning direction is in inverse proportion to each other as the scanning position is moved between the exposed portion of the reflection layer 122 and the λ/4 birefringence member 123.

In the embodiment shown in FIG. 26, circularly polarized laser beam is irradiated from the emitter 162, and there is provided an optical system for identifying the reflection laser beam having a different phase in the reflection light detector 164. As in the embodiment shown in FIG. 6, on the reflection optical axis of the perforated mirror 103, a condenser lens 110, a second λ/4 birefringence member 111, a pinhole 112, a polarized beam splitter 113, and a first photodetector 114 comprising a photodiode and the like are sequentially arranged in this order as seen from the perforated mirror 103, and a second photodetector 115 comprising a photodiode and the like is arranged on the reflection optical axis of the polarized light beam splitter 113. Outputs from the first photodetector 114 and the second photodetector 115 are inputted to the reflection light detection circuit 116.

The polarized light beam splitter 113 splits the polarized reflection laser beam entering the reflection light detector 164 and allows the split beams to enter the first photodetector 114 and the second photodetector 115. The second λ/4 birefringence member 111 and the polarized light beam splitter 113 are arranged in such manner that the laser beam emitted from the emitter 162 and returned to the main unit after passing through the λ/4 birefringence member twice, i.e. the polarized reflection laser beam, enters the first photodetector 114, and the laser beam from the reflection layer 122 having a different direction of polarization from that of the above laser beams enters the second photodetector 115.

Although not specifically explained, it is equipped with the reflection light detection circuit 116 which detects the polarized reflection laser beam as shown in FIG. 7.

Figure 27B:
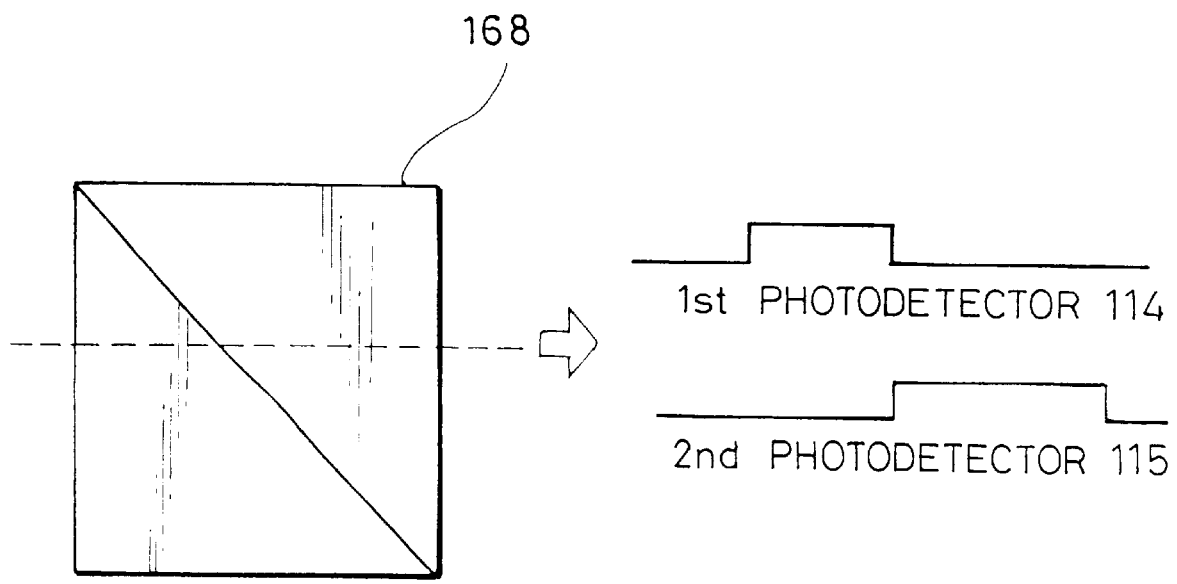
Figure 28:
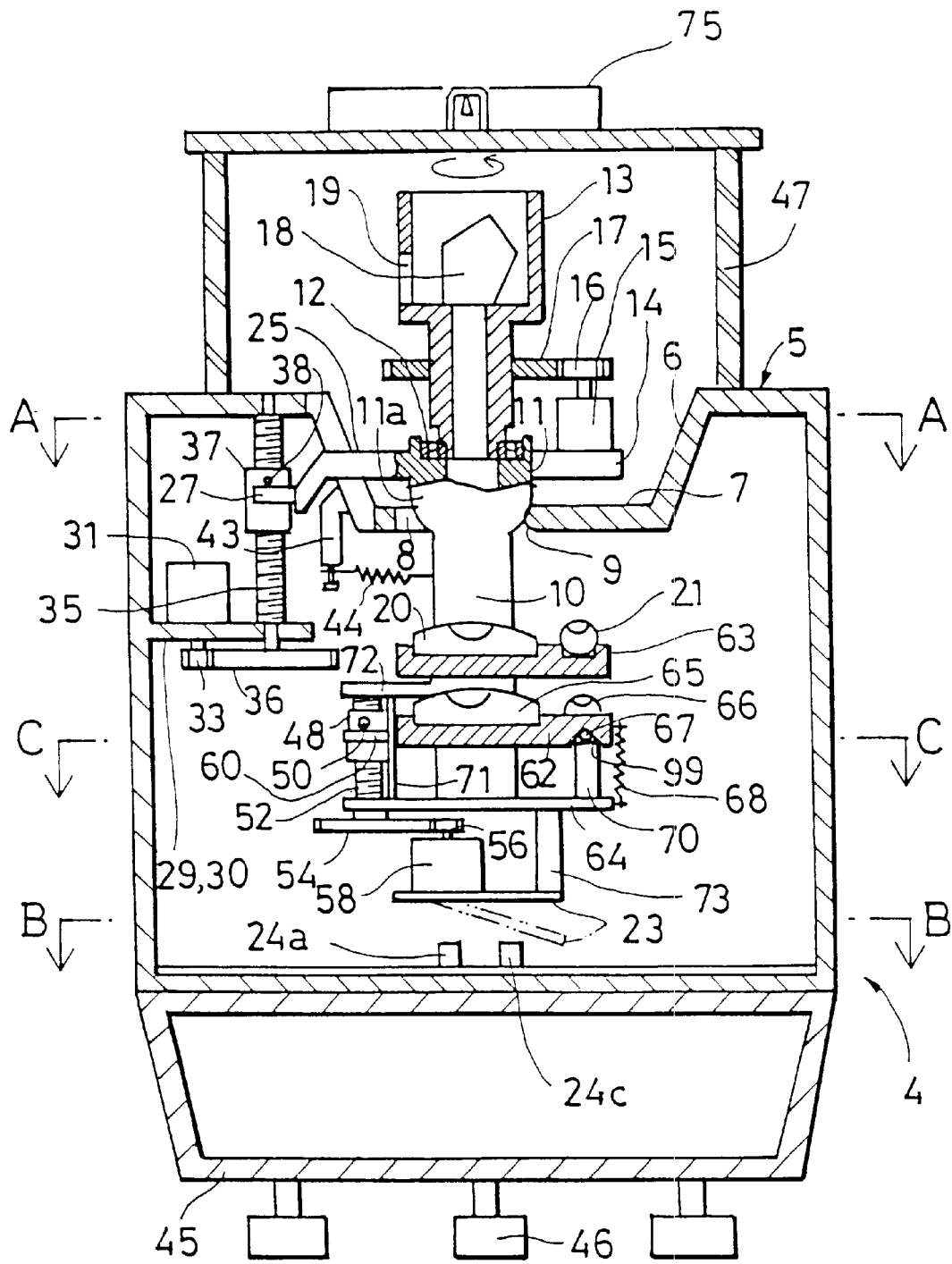
FIG. 28 is a cross-sectional view of a conventional example.
Figure 29:
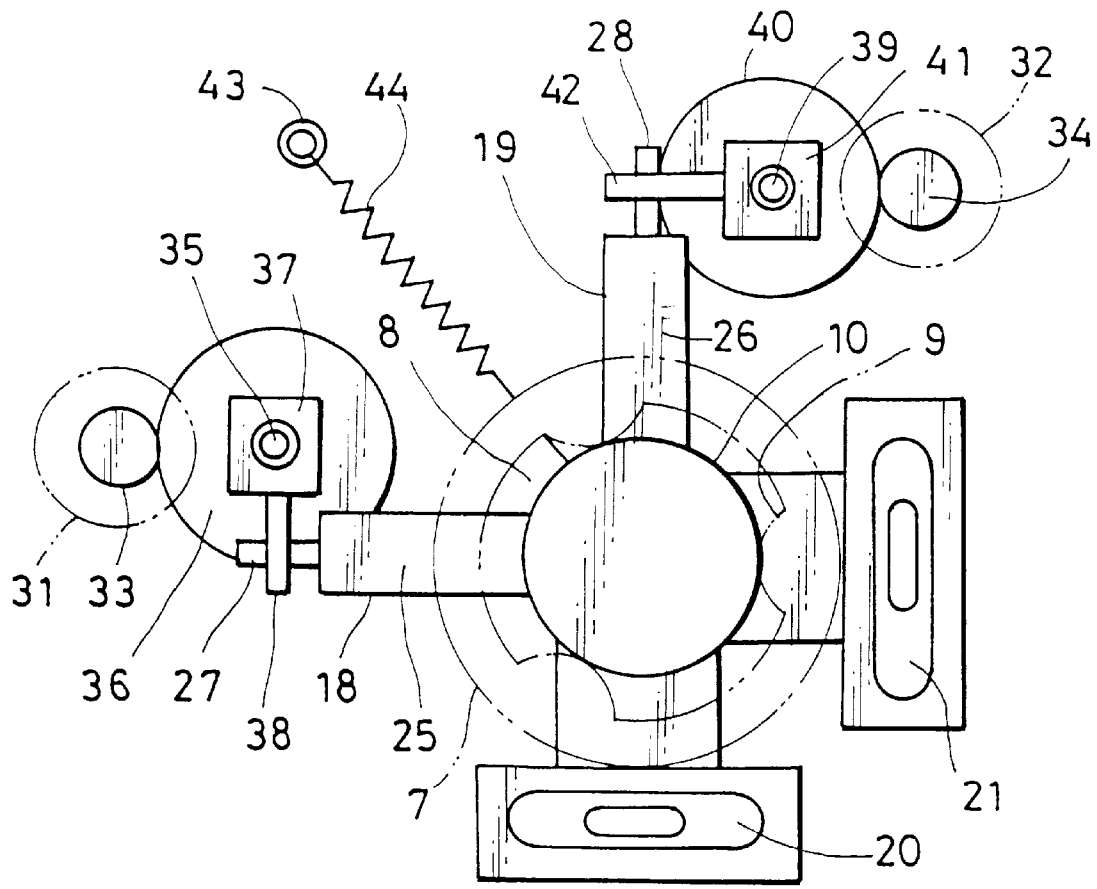
FIG. 29 is an arrow diagram along the line A—A in FIG. 28.
Figure 30:
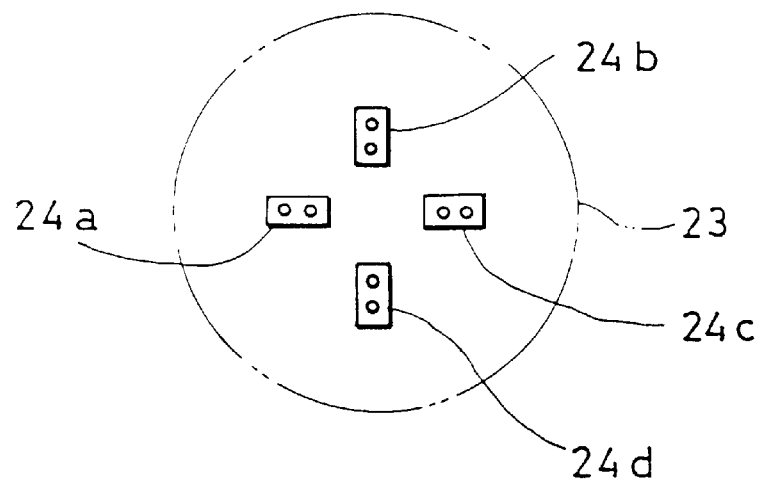
FIG. 30 is an arrow diagram along the line B—B in FIG. 28.
Figure 31:
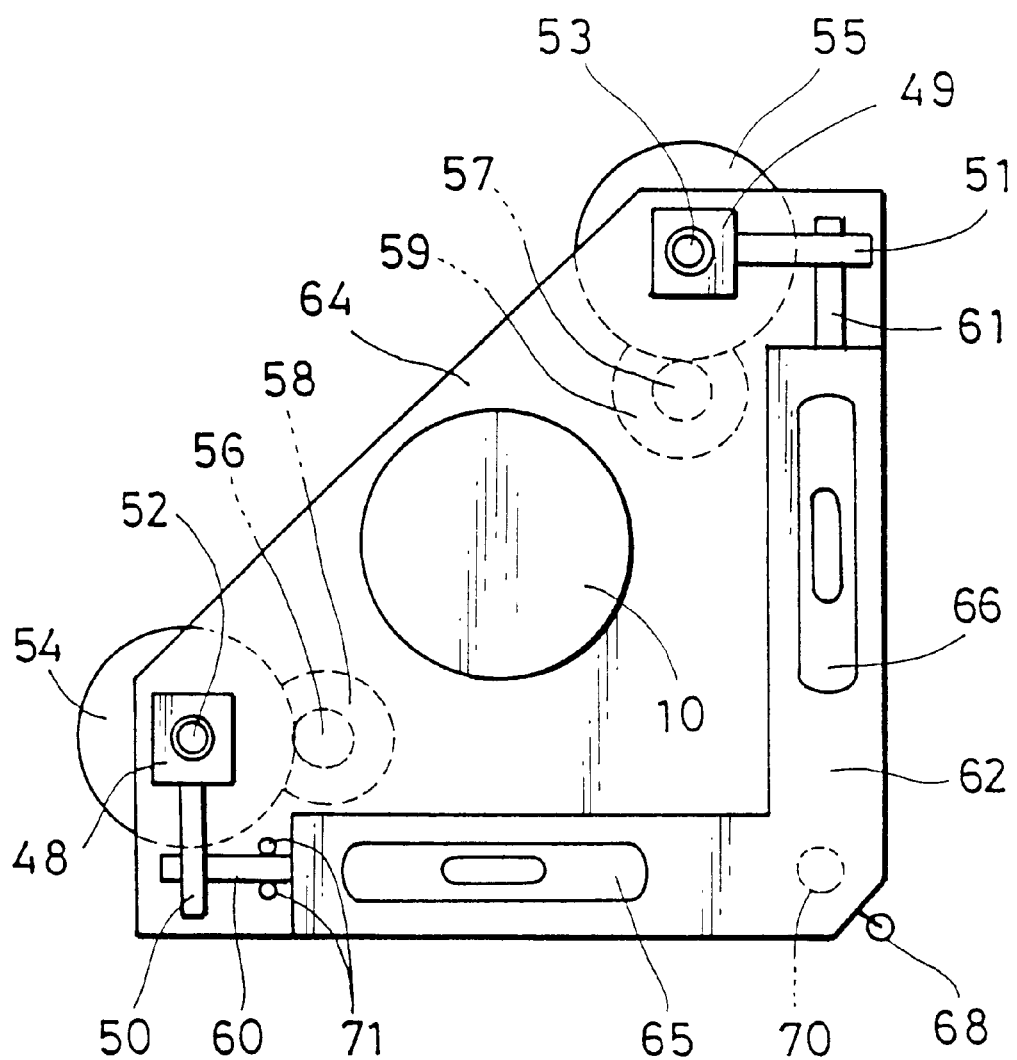
FIG. 31 is an arrow diagram along the line C—C in FIG. 28.
Figure 32:
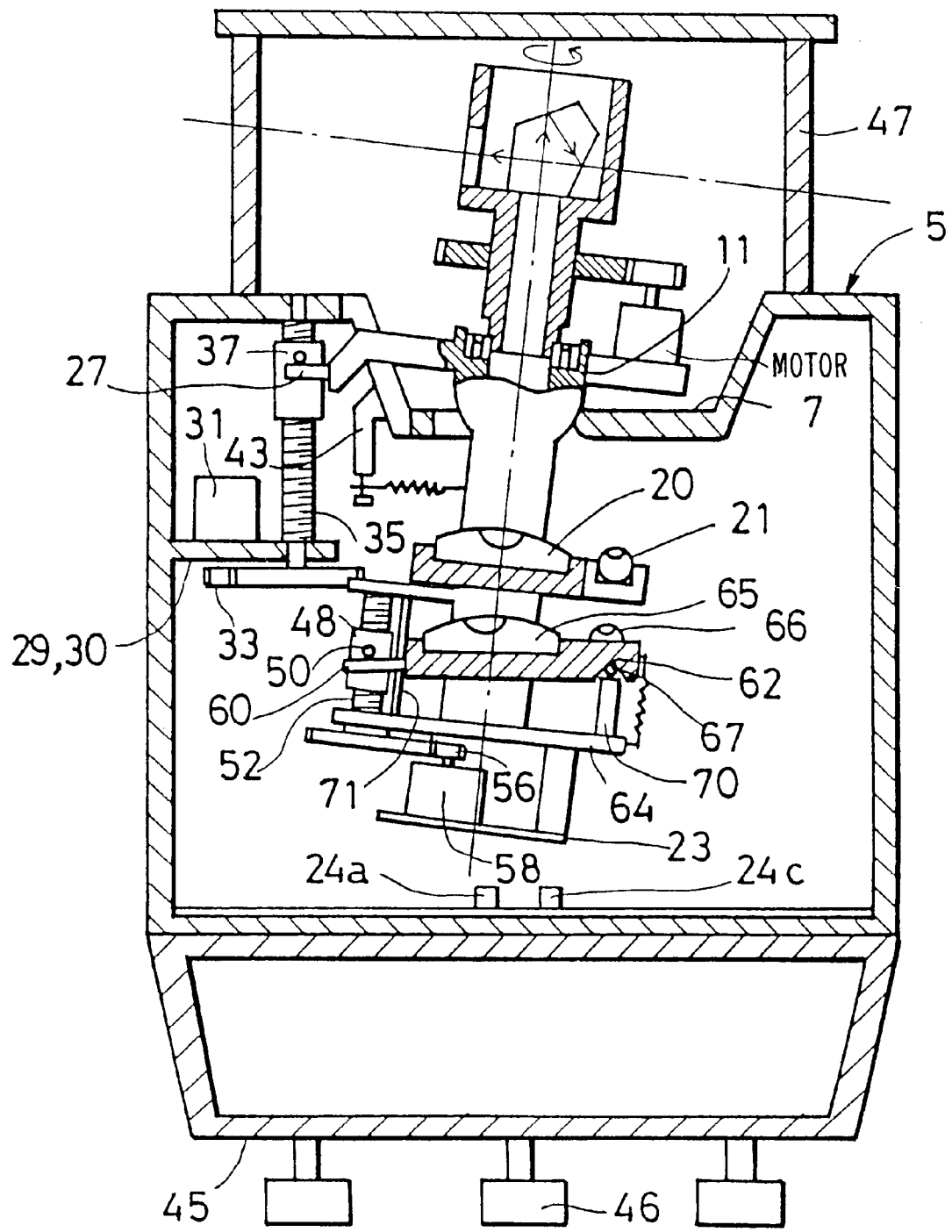
FIG. 32 is a drawing for explaining operation of the conventional example.
Figure 33:
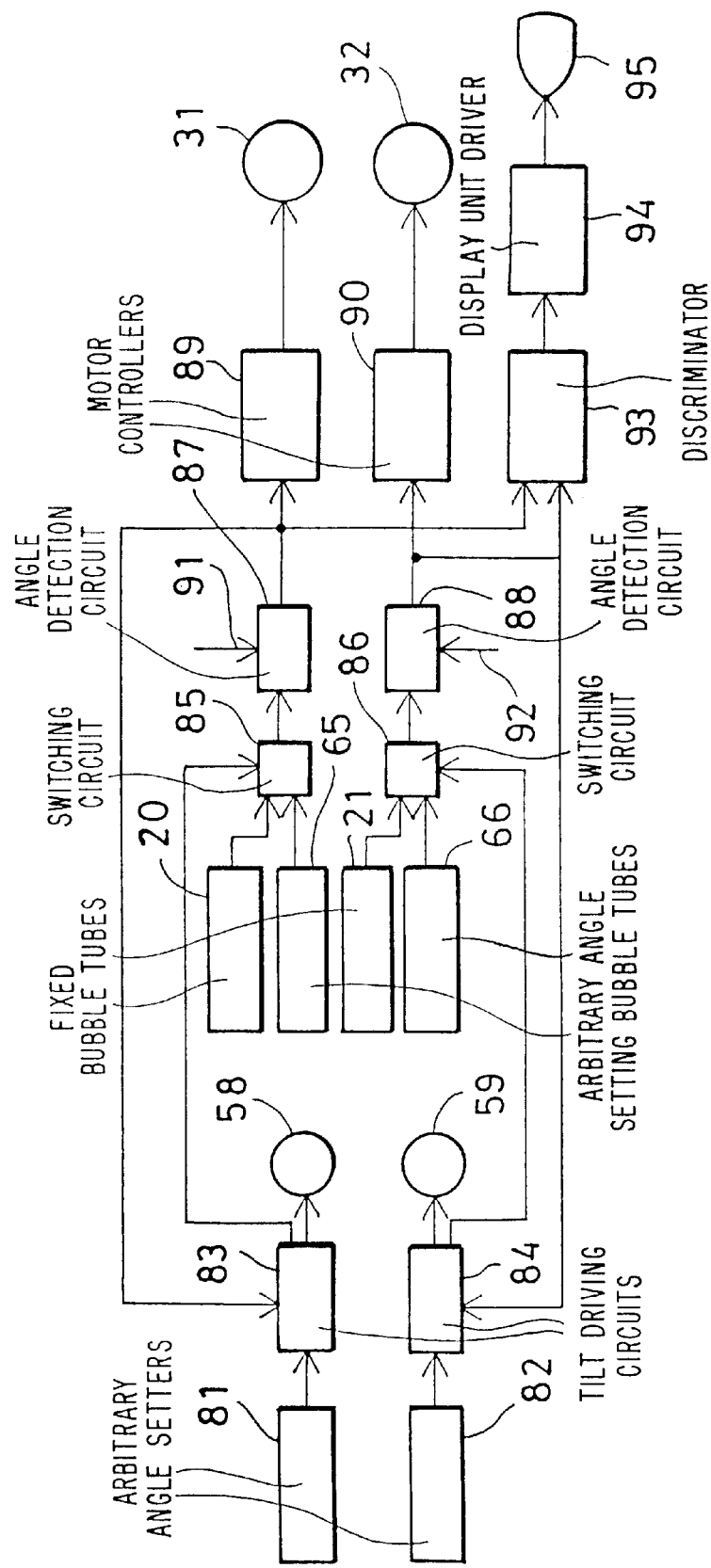
FIG. 33 is a block diagram of a control system of the conventional example.
Figure 34:
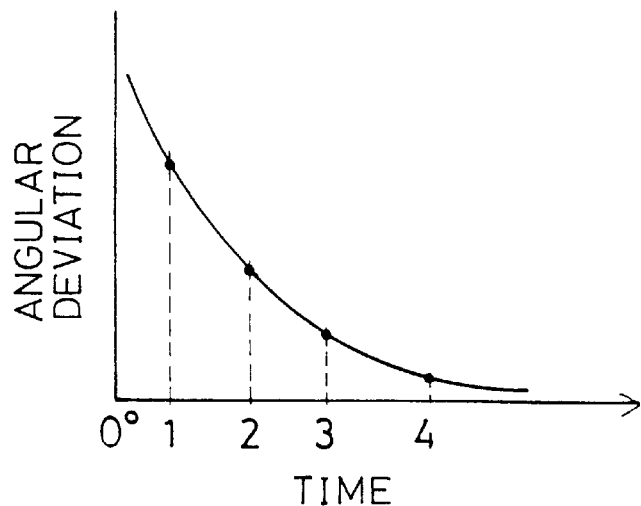
FIG. 34 is a diagram showing leveling status.
Figure 35:
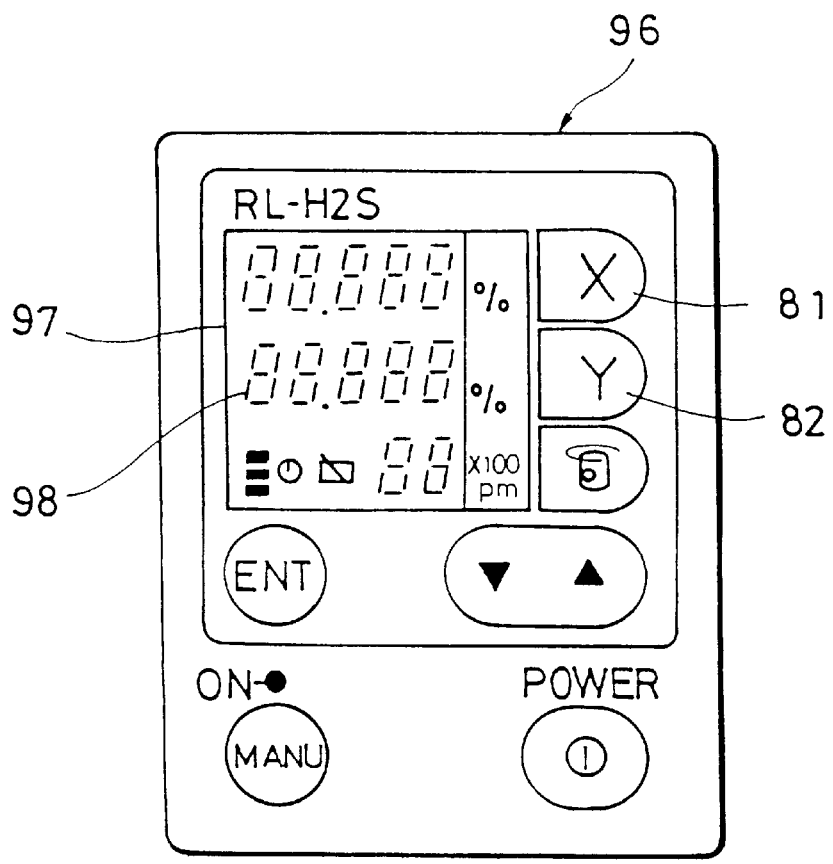
FIG. 35 is an illustration of an example of a controller.

The reflection laser beam reflected by the exposed portion of the reflection layer 122 is deviated by λ/2 in phase from the reflection laser beam reflected by the λ/4 birefringence member 123. Accordingly, in the two reflection laser beams converted to linearly polarized light by the second λ/4 birefringence member 111, the plane of polarization is deviated by 90°. Therefore, between the reflection laser beams reflected by the exposed portion of the reflection layer 122 and the reflection laser beam reflected by the λ/4 birefringence member 123, the light quantity entering the first photodetector 114 is different from the light quantity entering the second photodetector 115 as shown in FIG. 27B.

When the laser beam is rotated and irradiated to scan the object reflector 168 and the scanning position is moved in vertical direction, the intensity of the signal changes in inverse proportion between the reflection laser beam reflected by the exposed portion of the reflection layer 122 and the reflection laser beam reflected by the λ/4 birefringence member 123. The point where the two signals concur is the center of the object reflector 168, and the center of the object reflector 168 can be detected by the reflection light detection circuit 116. The operation after the center of the object reflector 168 has been detected is the same as described above.

Figure 19:
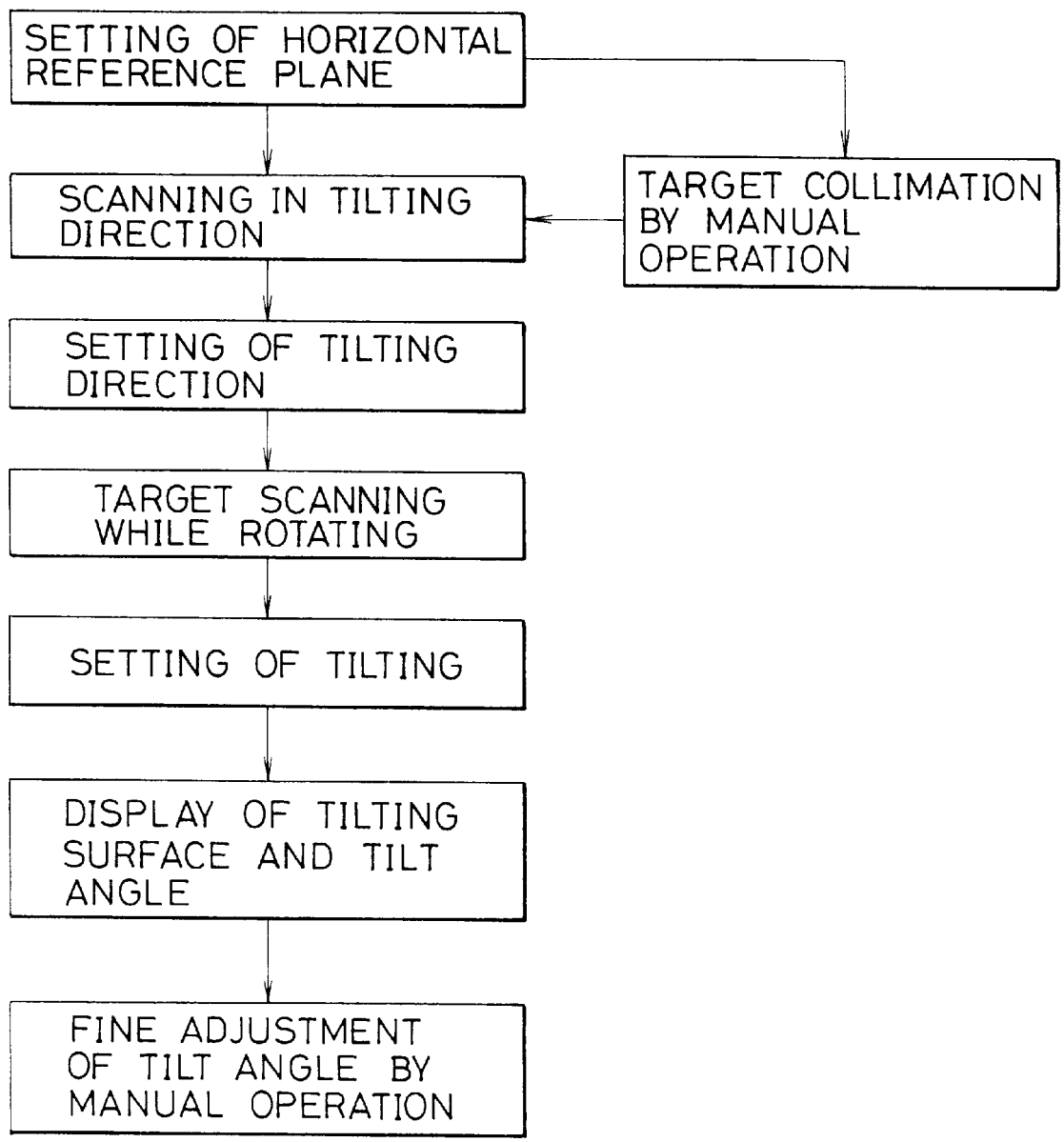
FIG. 19 is a flow chart showing operation in case tilting of the laser beam to be irradiated is determined by utilizing the object reflector.

Description is now given on tilting direction and tilt angle setting operation in case the object reflectors shown in FIGS. 21, 22, 23 and 27 are used, referring to FIG. 19. The instrument is set to the horizontal reference plane as in case where the object reflector of FIG. 20 is used, and the laser beam is rotated and irradiated, and scanning is performed in tilting direction. When the reflection light from the object reflector 168 is detected, the main unit 4 is rotated, and the tilting direction is set.

The rotating unit 163 is rotated while irradiating the laser beam after the tilting direction has been set. The level adjusting motors 31 and 32 are operated, and the laser projector 10 is tilted.

As described above, scanning is performed in horizontal direction while changing the irradiating position with respect to the object reflector 168 in vertical direction. Then, the center position of the object reflector 168 can be detected, and the tilt angle can be set and displayed without stopping the instrument.

Figure 24:
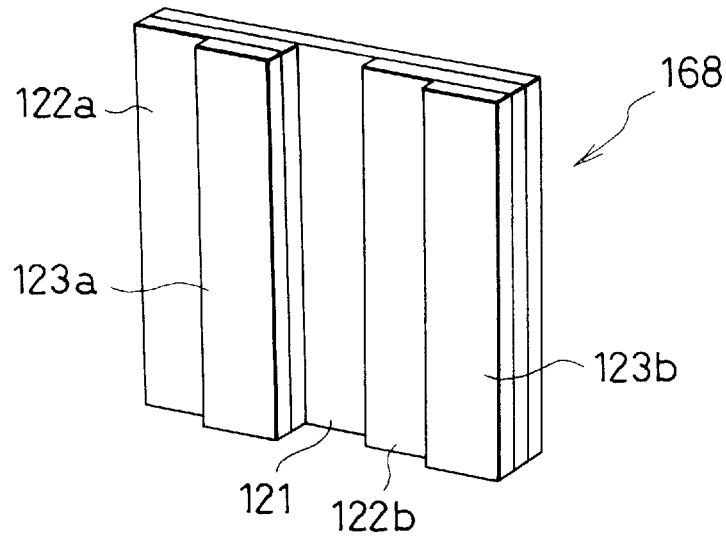
FIG. 24 represents an improved example of the object reflector.
Figure 25A:
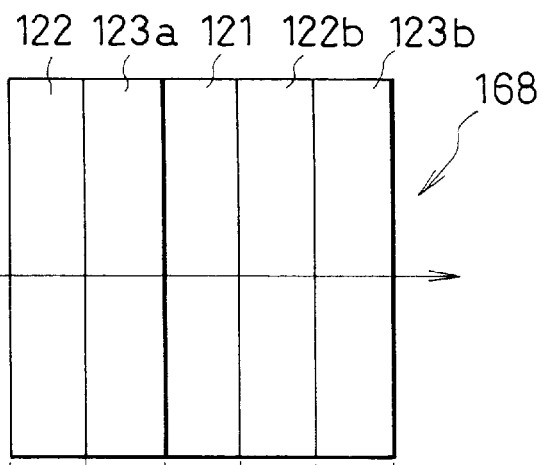
FIG. 25A and FIG. 25B each represents relationship of outputs from the object reflector, the laser beam, and the reflection detection circuit.
Figure 25B:
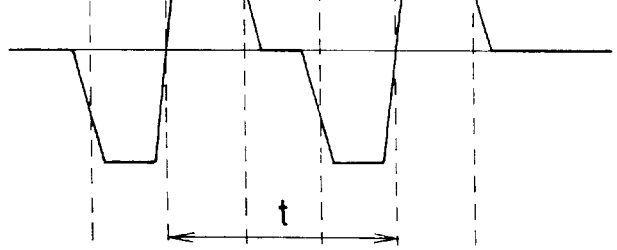

Further, description is given on an improved example of the object reflector 168, referring to FIGS. 24, 25A and 25B.

Normally, when the reflection laser beam is received from the object reflector, photodetection signal does not start up as clearly soon as the light is received, but it starts up with a somewhat ambiguous or indefinite inclination as the periphery of the spot light of the reflection laser beam is less luminous than the center of it. This ambiguousness or indefiniteness can be eliminated when the polarized light maintaining reflecting surface and the polarized light converted reflecting surface are provided and the boundary between the two surfaces is detected.

Description is given on the object reflector 168, referring to FIGS. 24, 25A and 25B. On this object reflector 168, tablet-like reflection layers 122a and 122b are arranged on left and right portions of the substrate 121 respectively, and the central portion of the substrate 121 is exposed in tablet-like shape. Also, λ/4 birefringence members 123a and 123b are attached to overlap on the right half of each of the reflection layers 122a and 122b, and two sets of combined reflecting units having a combination of the polarized light maintaining reflecting surface and the polarized light converted reflecting surface are provided. The reflection layers 122a and 122b may be arranged in such manner that not only the central portion of the substrate 121 but also the peripheral portions are exposed. Also, 3 sets or more of the combined reflecting units may be provided.

In case the scanning with the laser beam is performed on the object reflector 168 as shown in FIG. 25A, output signal from the differential amplifier 134 is as shown in FIG. 25B, and two signals can be obtained which have reversed signs (+ and −) definitely divided at the non-reflecting portion. By detecting the point of reversal of the signs of the signals, i.e. the boundary between the polarized light maintaining reflection surface and the polarized light converted reflecting surface, ambiguousness or indefiniteness of the start-up of the signal can be eliminated, and it is possible accurately and correctly to identify that it is the light beam reflected from the object reflector. Further, the time difference t between the two signals having reversed signs is specific to the object reflector 168. Thus, by detecting the time difference t, it is possible to accurately identify that it is the object reflector 168. Even when there is reflection light from an object such as laminated glass, it can be easily identified from the reflection light reflected by floor surface, and erroneous operation does not occur.

Because the combined reflecting portion having a polarized light maintaining reflecting surface and a polarized light converted reflecting surface is arranged in belt-like form and these are arranged on both lateral edges of the substrate 121 or arranged in diagonal direction as shown in FIG. 23, the target center of the object reflector can be accurately detected.

As described above, it is possible according to the present invention to easily align the laser survey instrument with the reference position because the installing direction of the survey instrument is detected by the survey instrument itself, because there is no man-made error and detection is made accurately, and because laser beam is emitted in downward direction. In particular, it is useful when the laser survey instrument is to be installed at a position higher than the ground surface.

What is claimed is:

1. A laser survey instrument for forming a laser reference plane in a plane with a preset tilt with respect to at least in one direction, said laser survey instrument comprising:

a laser projector having a light source to emit a laser beam and for irradiating and rotating the emitted laser beam;

a supporting mechanism for tiltably supporting said laser projector at least in one direction of the instrument;

a tilting means for tilting said laser projector to the preset tilt;

a detecting means for identifying orientations of the instrument with respect to a predetermined direction;

a rotating means for rotating the instrument; and a control means for controlling said rotating means to rotate the instrument based on the identification of said detecting means, and controlling said tilting means to tilt said laser projector to the preset tilt.

2. A laser survey instrument for forming a laser reference plane in a plane with a preset tilt with respect to at least in one direction, said laser survey instrument comprising:

a rotatable instrument;

a laser projector having a light source to emit a laser beam and for irradiating and rotating the emitted laser beam;

a supporting mechanism for tiltably supporting said laser projector at least in one direction of the instrument;

a tilting means for tilting said laser projector to the preset tilt angle;

a detecting means for identifying the orientation of the instrument with respect to a predetermined direction;

a display means for displaying orientations of the instrument with respect to a predetermined direction; and a control means for displaying said orientations of the instrument with respect to said predetermined direction on said display means, controlling said tilting means based on the identification of said detecting means, and tilting the laser projector so as to correspond to the preset tilt.

3. A laser survey instrument according to claims 1 or 2, wherein an object reflector is positioned in said predetermined direction, said detecting means comprises a position discrimination means for detecting an irradiating direction of the laser beam and a tilting direction of said laser projector and a photoreceiving means for receiving the laser beam from said object reflector, wherein the orientation of the instrument is identified by the photoreceiving result of said photoreceiving means.

4. A laser survey instrument for forming a laser reference plane corresponding to an arbitrary tilt to be set with respect to at least in one direction, said laser survey instrument comprising:

a laser projector having a light source to emit a laser beam and for irradiating and rotating the emitted laser beam;

a supporting mechanism for tiltably supporting said laser projector at least in one direction of the instrument;

a tilting means for tilting said laser projector to the tilt to be set;

a detecting means for identifying orientations of said laser projector and orientations of said instrument with respect to a predetermined direction;

a rotating means for rotating the instrument; and a control means for controlling the orientation of the instrument by said rotating means based on the identification of said detecting means, controlling said tilting means, and tilting said laser projector to the arbitrary tilt to be set.

5. A laser survey instrument for forming a laser reference plane in a plane with a preset tilt with respect to at least in one direction, said laser survey instrument comprising:

a laser projector having a light source to emit a laser beam and for irradiating and rotating the emitted laser beam;

a supporting mechanism for tiltably supporting said laser projector at least in one direction of the instrument;

a tilting means for tilting said laser projector to the preset tilt angle;

a detecting means for identifying orientations of said laser projector and the orientation of said instrument with respect to a predetermined direction;

a display means for displaying the orientation of said laser projector and the orientation of said instrument with respect to a predetermined direction; and a control means for displaying said orientation of the laser projector and said orientation of the instrument with respect to a predetermined direction on said display means based on the identification of said detecting means.

6. A laser survey instrument according to claims 4 or 5, wherein an object reflector is positioned in said predetermined direction, said detecting means comprises a photoreceiving means for receiving the laser beam from said object reflector, and the orientation of said laser projector with respect to said object reflector is identified based on the detection result of said photoreceiving means.

7. A laser survey instrument for tilting at least in one direction of two directions perpendicular to each other and forming a tilted laser reference plane, said laser survey instrument comprising:

a laser projector having a light source to emit a laser beam and for irradiating and rotating the emitted laser beam;

a supporting mechanism for tiltably supporting said laser projector at least in one direction of the instrument;

a tilting means for tilting said laser projector to an arbitrary tilt to be set;

a detecting means for identifying a deviation in orientations of said laser projector with respect to a predetermined direction;

a rotating means for rotating the instrument; and a control means for controlling said rotating means to rotate the instrument based on the identification of said detecting means, and controlling said tilting means to tilt said laser projector to the arbitrary tilt to be set.

8. A laser survey instrument for forming a tilted laser reference plane corresponding to a tilt setting obtained by tilt presetting at least in one direction of two directions perpendicular to each other, said laser survey instrument comprising:

- a laser projector having a light source to emit a laser beam and for irradiating and rotating the emitted laser beam;
- a supporting mechanism for tiltably supporting said laser projector at least in one direction of the instrument;
- a tilting means for tilting said laser projector so as to correspond to the preset tilt;
- an object reflector positioned in a predetermined direction away from the instrument;
- a detecting means for identifying a deviation in orientations of the instrument by a reflected light from said object reflector;
- a rotating means for rotating the instrument; and
- a control means for controlling said rotating means to rotate the instrument based on the identification of said detecting means, and controlling said tilting means to tilt said laser projector to the preset tilt.

9. A laser irradiating method for forming a laser reference plane in a plane with a preset tilt with respect to at least in one direction, which comprises:

- irradiating and rotating a laser beam emitted by a light source with a light axis on a plane perpendicular to said light axis so as to form a reference plane;
- identifying a deviation in orientations of the instrument with respect to a predetermined direction by scanning said laser beam within said reference plane;
- rotating the instrument toward said predetermined direction; controlling the rotation in such manner that the orientation of the instrument is correspondent to said predetermined direction based on the identification; and
- forming a reference plane by means of tilting the light source at a preset tilt in said predetermined direction and controlling the light source.

* * * * *